US012716603B2

(12) United States Patent
Read et al.

(10) Patent No.: US 12,716,603 B2
(45) Date of Patent: Aug. 25, 2026

(54) WALL-MOUNTED CONTROL DEVICE

(71) Applicant: Resideo USA LLC, Golden Valley, MN (US)

(72) Inventors: Travis J. Read, Golden Valley, MN (US); Nathan Carlson, Golden Valley, MN (US); Jonathan Erbacher, Golden Valley, MN (US); Andrew Oudhraj, Golden Valley, MN (US); Ricardo Alonso Gonzalez, Golden Valley, MN (US); David Mulhouse, Golden Valley, MN (US); Miguel Diaz, Golden Valley, MN (US); Jesus Arnoldo Hernandez, Golden Valley, MN (US); Aram Aguilera, Golden Valley, MN (US); Connor Brewin, Golden Valley, MN (US); Santosh Mallikarjuna Mandiganal, Golden Valley, MN (US); Mohammad A. Aljabari, Golden Valley, MN (US)

(73) Assignee: Resideo USA LLC, Golden Valley, MN (US)

( * ) Notice: Subject to any disclaimer, the term of this patent is extended or adjusted under 35 U.S.C. 154(b) by 0 days.

(21) Appl. No.: 18/572,574

(22) PCT Filed: Jun. 16, 2022

(86) PCT No.: PCT/US2022/072993

§ 371 (c)(1),
(2) Date: Dec. 20, 2023

(87) PCT Pub. No.: WO2022/272229

PCT Pub. Date: Dec. 29, 2022

(65) Prior Publication Data

US 2024/0337402 A1 Oct. 10, 2024

Related U.S. Application Data

(60) Provisional application No. 63/212,882, filed on Jun. 21, 2021, provisional application No. 63/212,841,
(Continued)

(51) Int. Cl.
*F24F 11/523* (2018.01)
*F21V 8/00* (2006.01)
*F24F 11/89* (2018.01)

(52) U.S. Cl.
CPC ............ *F24F 11/523* (2018.01); *F24F 11/89* (2018.01); *G02B 6/005* (2013.01); *G02B 6/0058* (2013.01);
(Continued)

(58) Field of Classification Search
CPC .......... F24F 11/523; F24F 11/89; F24F 11/70; G02B 6/005; G02B 6/0058; G02B 6/0068; G02B 6/0088; G02B 6/0073
See application file for complete search history.

(56) References Cited

U.S. PATENT DOCUMENTS 8,280,673 B2 10/2012 Aljabari
10,859,281 B2 12/2020 Read et al.
(Continued)

FOREIGN PATENT DOCUMENTS

EP 2733414 A2 * 5/2014 ................ F21V 8/00
EP 2972113 B1 1/2021
(Continued)

OTHER PUBLICATIONS

International Search Report in PCT International Application No. PCT/US2022/072993 mailed Jan. 24, 2023.

*Primary Examiner* — Scott D Au
(74) *Attorney, Agent, or Firm* — Greenberg Traurig, LLP; Ryan D. Sharp; Andrew Cull

(57) ABSTRACT

In some examples, a wall-mounted control device includes a display, a circuit board, and a plurality of light emitting
(Continued)

diodes (LEDs) coupled to the circuit board and configured to illuminate a plurality of icons on the display. The wall-mounted control device also includes a light guide positioned between the circuit board and the display, where the light guide is configured to block at least ninety percent of the light generated by a first LED of the plurality of LEDs from traveling to a second LED of the plurality of LEDs.

18 Claims, 16 Drawing Sheets

Related U.S. Application Data filed on Jun. 21, 2021, provisional application No. 63/212,886, filed on Jun. 21, 2021, provisional application No. 63/212,846, filed on Jun. 21, 2021, provisional application No. 63/212,831, filed on Jun. 21, 2021.

(52) U.S. Cl.
CPC ......... *G02B 6/0068* (2013.01); *G02B 6/0073* (2013.01); *G02B 6/0088* (2013.01)

(56) References Cited

U.S. PATENT DOCUMENTS

| | | | | |
|---|---|---|---|---|
| 2006/0283697 | A1* | 12/2006 | Garfio | H01H 9/182 200/310 |
| 2012/0163028 | A1* | 6/2012 | Chung | G06F 3/0202 362/613 |
| 2015/0160633 | A1 | 6/2015 | Adamik et al. | |
| 2016/0154170 | A1 | 6/2016 | Thompson et al. | |
| 2016/0334076 | A1 | 11/2016 | Dong et al. | |
| 2017/0050175 | A1* | 2/2017 | Farr | A61K 47/32 |
| 2018/0052274 | A1 | 2/2018 | Nichol et al. | |
| 2019/0094069 | A1 | 3/2019 | Xu et al. | |
| 2020/0217497 | A1 | 7/2020 | Chen et al. | |
| 2021/0164623 | A1 | 6/2021 | Kraz et al. | |

FOREIGN PATENT DOCUMENTS

| | | | |
|---|---|---|---|
| JP | 6132762 | B2 | 5/2017 |
| KR | 100814117 | B1 | 3/2008 |
| WO | 2015171571 | A2 | 11/2015 |

* cited by examiner

WALL-MOUNTED CONTROL DEVICE

CROSS-REFERENCE TO RELATED APPLICATIONS

This application is a U.S. National Phase patent application under 35 U.S.C. 371 of International Application No. PCT/US2022/072993, filed Jun. 16, 2022, which claims the benefit of and priority to U.S. Provisional Patent Application No. 63/212,831, filed Jun. 21, 2021, U.S. Provisional Patent Application No. 63/212,841, filed Jun. 21, 2021, U.S. Provisional Patent Application No. 63/212,846, filed Jun. 21, 2021, U.S. Provisional Patent Application No. 63/212,882, filed Jun. 21, 2021, and U.S. Provisional Patent Application No. 63/212,886, filed Jun. 21, 2021. The entire content of each of these applications is incorporated herein by reference.

TECHNICAL FIELD

The disclosure relates to wall-mounted control devices, such as thermostats for buildings, including systems with wall-mounted control devices and methods for designing, assembling, and operating wall-mounted control devices.

BACKGROUND

A wall-mounted control device can control the appliances and internet of things devices in a smart building environment, such as the heating, ventilation, and air conditioning (HVAC) system in the building. The HVAC system may include a furnace, a heat pump including a geothermal heat pump, a boiler, air conditioning unit, forced air circulation, mini split system (e.g., ductless), radiant heat (e.g., baseboard), and/or other similar equipment to control the internal climate conditions of a building. In some examples, a thermostat can control different devices depending on the outside temperature, temperature inside the building, the time of day, and other factors.

SUMMARY

In general, this disclosure describes a wall-mounted control device including a light guide that blocks at least ninety percent of the light generated by one LED from traveling to another LED. The light guide may allow for a crisper, more readable display, as compared to another device that does not have a light guide for blocking the travel of light between LEDs. The wall-mounted control device may be able to have brighter icons without visible light bleed between the icons.

In general, this disclosure describes a wall-mounted control device including a display with light colored paint. The wall-mounted control device may also include an ambient light sensor positioned behind a portion of the display. The light colored paint may impede the ambient light by more than fifty percent as the light passes through the display to the ambient light sensor. The use of the light colored paint may hide the opening for the ambient light sensor, which allows a larger opening to be used for the ambient light sensor. The larger opening and the light colored paint may make the ambient light sensor relatively immune to the direction of a light source in a room. Thus, the display may disperse light received from various directions so that the ambient light sensor is less dependent on the orientation of a light source.

In general, this disclosure describes a wall-mounted control device including a light guide that blocks at least ninety percent of the light generated by a light emitting diode from traveling to an ambient light sensor. The light guide may increase the accuracy of the ambient light sensor in detecting the light outside the device by reducing the amount of internally generated light received by ambient light sensor. A more accurate ambient light sensor may allow for better tuning of the brightness of the display to the ambient light (e.g., a brighter display in a well-lit room).

In general, this disclosure describes a wall-mounted control device including an LED configured to illuminate an icon on a display of the wall-mounted control device. The wall-mounted control device may also include a conductive element with an opening for allowing light generated by the LED to pass through to the display. The opening in the conductive element may be shaped like the icon on the display to reduce the size and likelihood of a capacitive dead zone on the display.

In general, this disclosure describes a layout for a wall-mounted control device that includes a case back having a barrier and a vent. The barrier may prevent air flow between a vented region and a ventless region of the wall-mounted control device. The light emitting diodes (LEDs) of the wall-mounted control device may be positioned in the vented region, and a temps sensor may be positioned in the ventless region. This layout for the wall-mounted control device may reduce the dependence of the temperature in the ventless region on the heat generated by the LEDs in the vented region. The temperature in the ventless region may depend on the ambient temperature and allow for the wall-mounted control device to use temperature compensation techniques to determine the ambient temperature.

In some examples, a wall-mounted control device includes a display, a circuit board, and a plurality of LEDs coupled to the circuit board and configured to illuminate a plurality of icons on the display. The wall-mounted control device also includes a light guide positioned between the circuit board and the display, where the light guide is configured to block at least ninety percent of the light generated by a first LED of the plurality of LEDs from traveling to a second LED of the plurality of LEDs.

In some examples, a wall-mounted control device includes a circuit board, a plurality of LEDs coupled to a first surface of the circuit board, and a light guide in contact with the first surface of the circuit board. The wall-mounted control device also includes a display including a lens in contact with the light guide and a film layer in contact with the lens, where the light guide includes a plurality of ribs extending into the lens. The plurality of LEDs is configured to illuminate a plurality of icons on the film layer of the display, and the light guide is configured to block at least ninety percent of the light generated by a first respective LED of the plurality of LEDs from traveling to a second respective LED of the plurality of LEDs.

In some examples, a wall-mounted control device includes a circuit board, a display including a lens and a film layer, a first LED coupled to the circuit board and configured to illuminate a first icon on the display, a second LED coupled to the circuit board and configured to illuminate a second icon on the display, an ambient light sensor coupled to the circuit board, and a light guide positioned between and in contact with the circuit board and the lens. The light guide includes a first rib extending into the lens between the first LED and the second LED, the light guide includes a second rib extending into the lens between the first LED and the ambient light sensor, the light guide is configured to block at least ninety percent of the light generated by the first LED from traveling to the second LED, and the light guide is configured to block at least ninety percent of the light generated by the first LED from traveling to the ambient light sensor.

In some examples, a wall-mounted control device includes a display including light colored paint on a film layer. The wall-mounted control device also includes an ambient light sensor positioned behind a portion of the film layer. The light colored paint on the film layer is configured to impede light from outside of the wall-mounted control device by more than fifty percent as the light passes to the ambient light sensor.

In some examples, a wall-mounted control device includes a circuit board, an LED coupled to the circuit board, an ambient light sensor coupled to the circuit board, and a light guide in contact with the circuit board. The wall-mounted control device also includes a display including a lens in contact with the light guide and a film layer in contact with the lens. The light guide includes a rib extending into the lens, where the rib is positioned between the LED and the ambient light sensor, the plurality of LEDs is configured to illuminate an icon on the film layer of the display, and the film layer is configured to impede light from outside of the wall-mounted control device by more than fifty percent as the light passes through an opening in the light guide to the ambient light sensor.

In some examples, a wall-mounted control device includes a circuit board, an ambient light sensor coupled to the circuit board, and a display including light colored paint on an interior surface of a film layer. The wall-mounted control device also includes processing circuitry coupled to the circuit board and configured to receive a signal from the ambient light sensor, where the signal depends on a first brightness of the light sensed by the ambient light sensor. The processing circuitry is also configured to set a second brightness of the display by at least determining the second brightness of the display based on a look-up table and a magnitude of the signal.

In some examples, a wall-mounted control device includes a display including a lens and a film layer, a circuit board positioned behind the display, and an ambient light sensor coupled to the circuit board. The wall-mounted control device also includes a plurality of LEDs coupled to the circuit board and configured to illuminate a plurality of icons on the display. The wall-mounted control device further includes a light guide positioned between the circuit board and the lens, where the light guide is configured to block at least ninety percent of the light generated by the plurality of LEDs from traveling to the ambient light sensor.

In some examples, a wall-mounted control device includes a circuit board, a plurality of LEDs coupled to a first surface of the circuit board, an ambient light sensor coupled to the first surface of the circuit board, and a light guide in contact with the first surface of the circuit board. The wall-mounted control device also includes a display including a lens in contact with the light guide and a film layer including a first coat of light colored paint and a second coat of dark colored paint on an interior surface of the film layer. The light guide includes a rib that extends into the lens, the interior surface of the film layer is in contact with the lens, and the plurality of LEDs is configured to illuminate a plurality of icons on the film layer of the display. The rib is positioned between the ambient light sensor and the plurality of LEDs, and the rib is configured to block at least ninety percent of the light generated by the plurality of LEDs from traveling to the ambient light sensor.

In some examples, a wall-mounted control device includes a circuit board, a plurality of LEDs coupled to the circuit board, an ambient light sensor coupled to the circuit board, a display including a lens, and a light guide positioned between the circuit board and the lens. The ambient light sensor is positioned in an opening in the light guide, a first diameter of the opening at a first interface of the light guide and the lens is greater than five millimeters, and a second diameter of the opening at a second interface of the light guide and the circuit board is greater than three millimeters. The light guide includes a rib extending into the lens and positioned between the ambient light sensor and the plurality of LEDs, the plurality of LEDs is configured to illuminate a plurality of icons on the display, and the rib is configured to block at least ninety percent of the light generated by the plurality of LEDs from traveling to the ambient light sensor.

In some examples, a wall-mounted control device includes a display, a circuit board positioned behind the display, an LED coupled to the circuit board and configured to illuminate an icon on the display. The wall-mounted control device also includes a conductive element coupled to the circuit board and in contact with the display, where the conductive element includes an opening shaped like the icon, and the conductive element is configured to allow light generated by the LED to pass through the opening to the display.

In some examples, a wall-mounted control device includes a circuit board, a display including a lens, a light guide positioned between the circuit board and the lens, a first conductive element coupled to the circuit board, extending through a first opening in the light guide, and in contact with the lens. The wall-mounted control device also includes a second conductive element coupled to the circuit board, extending through a second opening in the light guide, and in contact with the lens, a first LED coupled to the circuit board and positioned in the first opening in the light guide, and a second LED coupled to the circuit board and positioned in the second opening in the light guide. The light guide includes a rib that extends into the lens, the first LED is configured to illuminate a first icon on the display, the second LED is configured to illuminate a second icon on the display, and a first shape of the second conductive element is identical to a second shape of the first conductive element. The first conductive element is configured to allow light generated by the first LED to pass through the first opening in the light guide and through a third opening in the first conductive element to the display, and the light guide is configured to block at least ninety percent of the light generated by the first LED from traveling to the second LED.

In some examples, a wall-mounted control device includes a display including a lens, a circuit board positioned behind the display, a light guide positioned between the circuit board and the lens, an LED coupled to the circuit board, configured to illuminate an icon on the display, and a case back including a barrier, and a vent. The wall-mounted control device also includes a temperature sensor coupled to the circuit board and positioned in a ventless region, a humidity sensor coupled to the circuit board and positioned in a vented region, and a conductive element coupled to the circuit board, extending through a first opening in the light guide, and in contact with the display. The LED is configured to illuminate an icon on the display, the conductive element is configured to allow light generated by the LED to pass through a second opening in the conductive element to the display. The barrier prevents air flow between the vented region and the ventless region, the vent allows air flow from outside of the wall-mounted control device to the vented region, and the LED is positioned outside of the ventless region.

In some examples, a wall-mounted control device includes a circuit board and a temperature sensor coupled to the circuit board. The wall-mounted control device also includes a plurality of LEDs coupled to the circuit board. The wall-mounted control device further includes a case back including a barrier and a vent. When the circuit board is attached to the case back, the barrier prevents air flow between a first region and a ventless region. When the circuit board is attached to the case back, the vent allows air flow from outside of the wall-mounted control device to the first region, the plurality of LEDs is positioned in the first region, and the temperature sensor is positioned in the ventless region.

In some examples, a wall-mounted control device includes a circuit board including a first portion and a second portion protruding from the first portion, where a length of the second portion is at least twice a width of the second portion. The wall-mounted control device also includes a temperature sensor coupled to the second portion of the circuit board, and a plurality of LEDs coupled to the circuit board. The wall-mounted control device further includes a case back including a first vent on a first side of an exterior of the case back, a barrier in an interior of the case back, and a second vent on a second side of an exterior of the case back, where a first normal vector of the first side is at least 120 degrees away from a second normal vector of the second side. When the circuit board is attached to the case back, the barrier prevents air flow between a first region and a ventless region, the first vent allows air flow from outside of the wall-mounted control device to the first region, the second vent allows air flow from outside of the wall-mounted control device to the first region, the plurality of LEDs is positioned in the first region, and the temperature sensor is positioned in the ventless region.

In some examples, a wall-mounted control device includes a circuit board, a temperature sensor coupled to the circuit board, a humidity sensor coupled to the circuit board, a plurality of LEDs coupled to the circuit board, and a case back including one or more interior barriers, a first vent, and a second vent. When the circuit board is attached to the case back, the one or more interior barriers prevent air flow between a first vented region and a first ventless region, between a second vented region and the first ventless region, and between the first ventless region and a second ventless region, where the first ventless region is adjacent to the first vented region, the second vented region, and the second ventless region. When the circuit board is attached to the case back, the first vent allows air flow from outside of the wall-mounted control device to the first vented region, the second vent allows air flow from outside of the wall-mounted control device to the second vented region, the plurality of LEDs is positioned in the first vented region, the temperature sensor is positioned in the second ventless region, and the humidity sensor is positioned in the second vented region.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
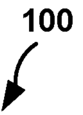
FIG. 1 is a diagram illustrating an example display of a wall-mounted control device, in accordance with one or more techniques described herein.
Figure 1:
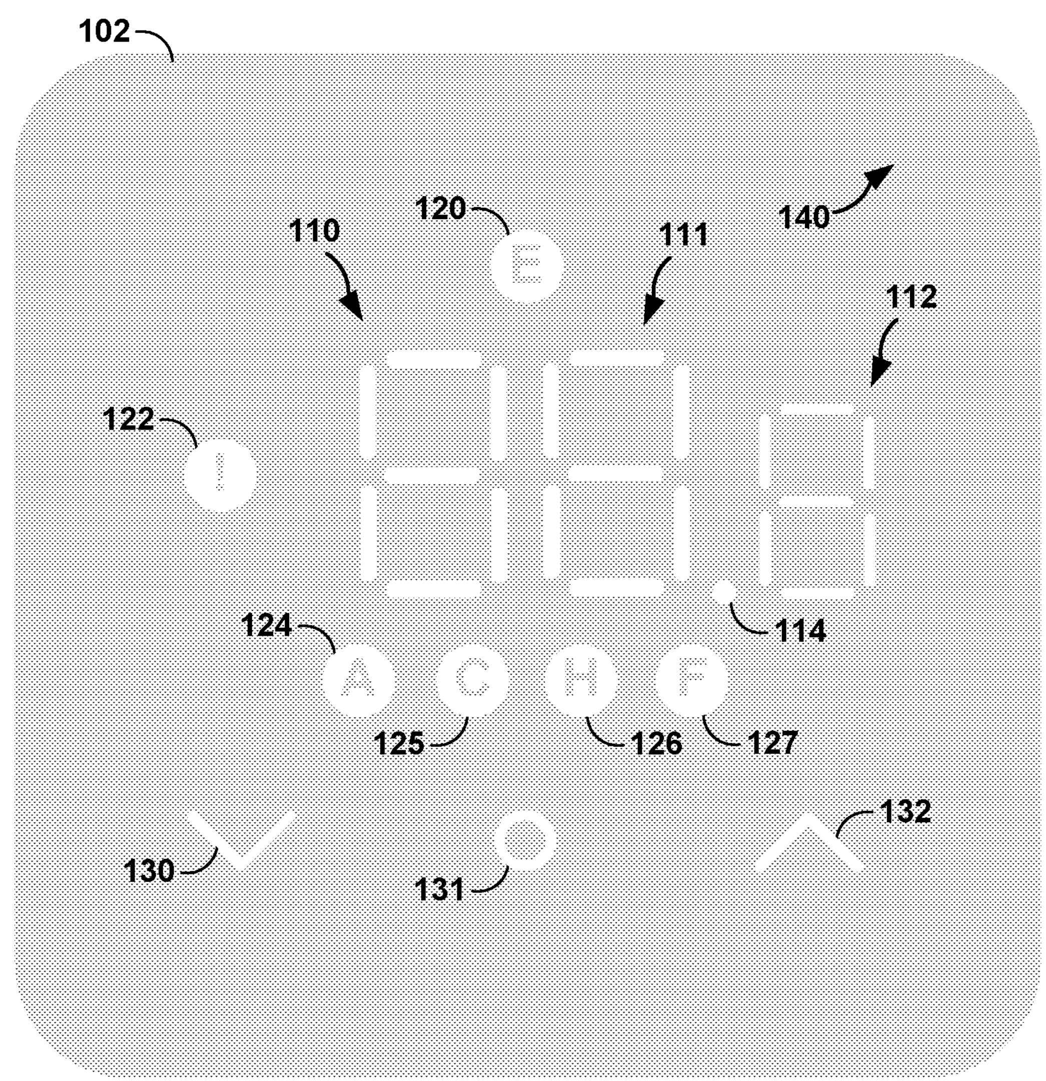

FIG. 1 is a diagram illustrating an example display 102 of a wall-mounted control device 100, in accordance with one or more techniques described herein. FIG. 1 may show the front face or exterior surface of display 102, which includes illuminated icons 110-112, 114, 120, 122, 124-127, and 130-132. Display 102 may be the user-facing surface of wall-mounted control device 100. The interface shown on display 102 is just one example of a user interface for wall-mounted control device 100, and other interfaces with fewer and/or additional icons are possible.

In some examples, zero, one, or more of icons 110-112, 114, 120, 122, 124-127, and 130-132 may be illuminated at any time. For example, wall-mounted control device 100 may be configured to illuminate icons 110-112 and/or 114 to present sensed values or setpoint values for the temperature or humidity. Each of icons 110-112 may include seven-segment displays for presenting all ten digits. In some examples, each of icons 114, 120, 122, 124-127, and 130-132 may be illuminated by a single respective light emitting diode (LED), whereas each segment of icons 110-112 may be illuminated by a single respective LED. Thus, wall-mounted control device 100 may include seven LEDs configured to illuminate the segments of each of icons 110-112.

Display 102 may be a blank surface when wall-mounted control device 100 is powered off or not illuminating any of icons 110-112, 114, 120, 122, 124-127, and 130-132. The blank surface of display 102 may be aesthetically desirable, especially in a room with similarly colored walls. Although icons 110-112, 114, 120, 122, 124-127, and 130-132 are shown as grey and white, some or all of icons 110-112, 114, 120, 122, 124-127, and 130-132 may include color in some examples. For example, wall-mounted control device 100 may be configured to illuminate energy saving icon 120 in green, alert icon 122 in yellow, cooling icon 125 in blue, and/or heating icon 126 in red.

Wall-mounted control device 100 may include an ambient light sensor, and wall-mounted control device may be configured to control the brightness of icons 110-112, 114, 120, 122, 124-127, and 130-132 based on an intensity of light sensed by the ambient light sensor. Wall-mounted control device 100 may be configured to have different brightness settings for icons 110-112, 114, 120, 122, 124-127, and 130-132 depending on whether wall-mounted control device 100 is operating in an active mode or an idle mode.

Wall-mounted control device 100 may be configured to illuminate icons 120, 122, and 124-127 to inform a user of the status of devices controlled by wall-mounted control device 100, such as HVAC devices. For example, wall-mounted control device 100 may be configured to illuminate icon 120 when wall-mounted control device 100 is operating in an energy saving mode. Wall-mounted control device 100 may be configured to illuminate icon 122 to present an alert. Wall-mounted control device 100 may be configured to illuminate icons 125-127 when wall-mounted control device 100 is operating in a cooling mode, a heating mode, or a fan-on mode. In addition, wall-mounted control device 100 may be configured to illuminate icons 130-132 to present arrows (e.g., icons 130 and 132) and a status mode icon (e.g., icon 131).

In some examples, wall-mounted control device 100 is not configured to receive user input via touch on display 102. In other examples, wall-mounted control device 100 may be configured to receive user input at a location on display 102 around some or all of icons 110-112, 114, 120, 122, 124-127, and 130-132. For example, in response to detecting that a user has touched an area of display 102 proximate icon 131, wall-mounted control device 100 may be configured to change a mode of operation. In response to detecting that a user has touched an area of display 102 proximate icon 130 or 132 (e.g., the up or down icon), wall-mounted control device 100 may be configured to change increment through options.

Wall-mounted control device 100 may also include ambient light sensor (not shown in FIG. 1) that is configured to receive light through display 102. For example, the ambient light sensor may be positioned in wall-mounted control device 100 behind corner 140. The front surface of display 102 may be configured to filter, disperse, attenuate, or impede ambient light and deliver some of the ambient light to the ambient light sensor.

The user-facing surface of display 102 may have a substantially square shape, as shown in FIG. 1. In some examples, the dimensions of the user-facing surface of display 102 may be approximately ten by ten centimeters or eight by eight centimeters. The largest dimension of the user-facing surface of display 102 may be between five and twenty centimeters, between eight and fifteen centimeters, between eight and twelve centimeters, or between eight and ten centimeters. The smaller dimension of the user-facing surface of display 102 may be between five and fifteen centimeters, between five and twelve centimeters, or between five and ten centimeters.

Figure 2:
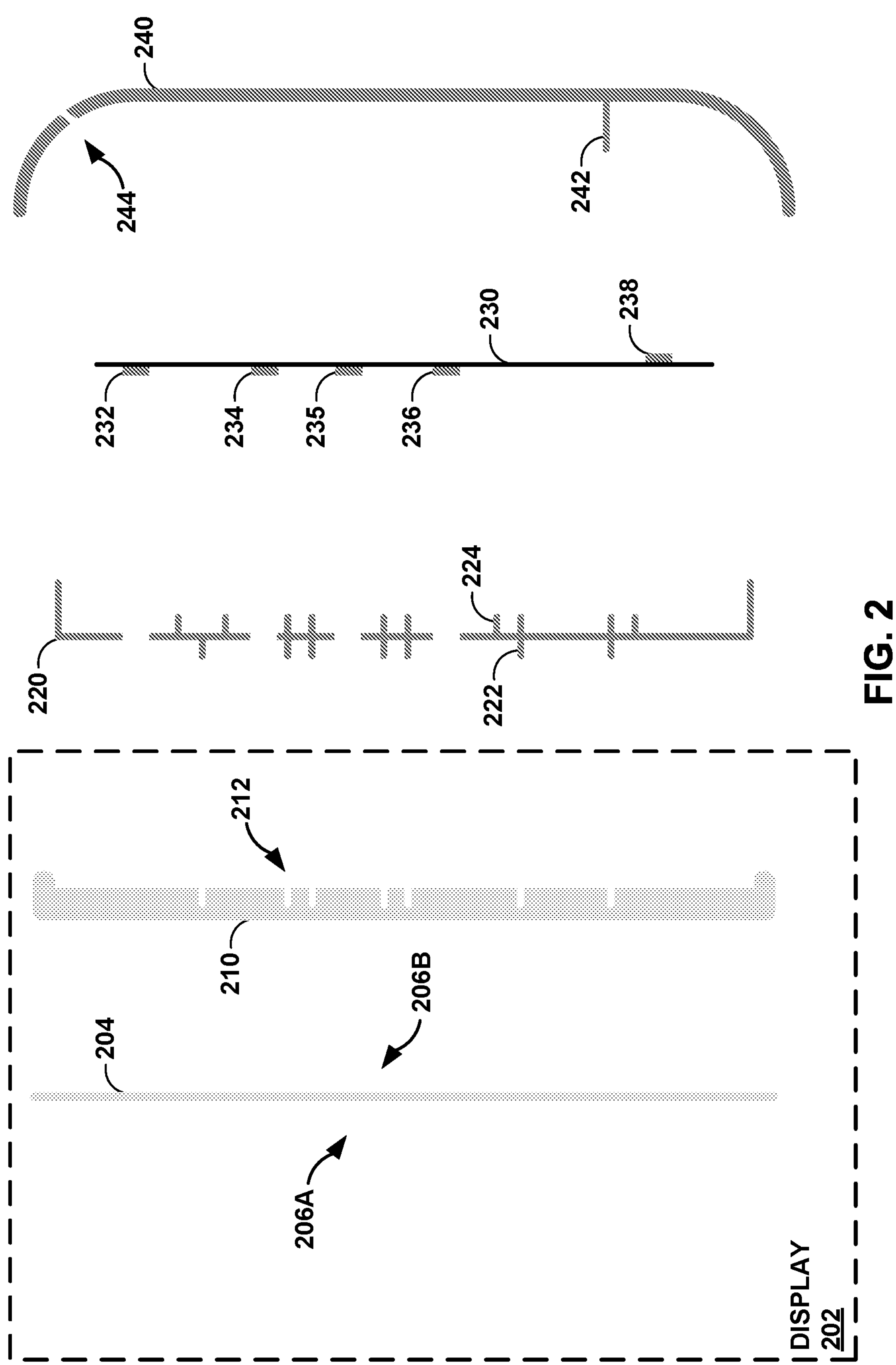
FIG. 2 is a side-view exploded diagram illustrating some components of an example wall-mounted control device, in accordance with one or more techniques described herein.

FIG. 2 is a side-view exploded diagram illustrating some components of an example wall-mounted control device, in accordance with one or more techniques described herein. FIG. 2 depicts the following components of a wall-mounted control device: display 202, lens 210, light guide 220, circuit board 230, and case back 240.

In the example of FIG. 2, display 202 includes film layer 204 and lens 210. Film layer 204 may be configured to be in contact with lens 210 when the wall-mounted control device is assembled. Film layer 204 may include a thin clear substrate with one or more layers of paint on interior surface 206B. Film layer 204 may include polymer material such as a polycarbonate material or another thermoplastic material. In some examples, interior surface 206B is coated with two or more layers of light colored paint and one or more layers of dark paint. The dark paint may not cover all of interior surface 206B of film layer 204; instead, there may be portions of lens without dark paint. The dark paint may act as a mask that allows light to pass from lens 210 to film layer 204 only where there are gaps or openings in the dark paint.

Film layer 204 may form the front face of the wall-mounted control device, and film layer 204 may also extend onto the sides of the wall-mounted control device. Front surface 206A of film layer 204 may be configured to face towards a user. Likewise, case back 240 may be configured to face towards and/or mount on a wall. The wall-mounted control device may be configured to illuminate icons on front surface 206A. In addition, the wall-mounted control device may be configured to receive user input by sensing that the user has touched display 202.

Lens 210 may be configured to be in contact with film layer 204 and light guide 220 when the wall-mounted control device is assembled. Film layer 204 may be in-mold laminated onto lens 210 and/or in-mold decorated onto lens 210. When the wall-mounted control device is assembled, lens 210 and light guide 220 may be tightly fitted together by, for example, heat staking.

Lens 210 may include indents 212, which may be configured to fit with or receive protrusions 222 of light guide 220. Indents 212 may be carved out of lens 210 using milling process such as computer numerical control. Film layer 204 and lens 210 may be configured to filter, disperse, impede, attenuate, and/or spread out ambient light from outside front surface 206A and deliver some of the ambient light to ambient light sensor 232. Lens 210 may be configured to act as a light pipe for carrying light between the dark surfaces of light guide 220 and interior surface 206B of film layer 204, which may be at least partially coated with dark paint. A point on interior surface 206B closest to (e.g., directly ahead or above) ambient light sensor 232 may not have dark paint. In other words, there may be an opening in the mask to allow ambient light to reach ambient light sensor 232.

Another device may include a thin white plastic sheet for a display, but the plastic may cause blurriness for the icons on the display. Film layer 204 may be less blurry than the thin white plastic sheet, but film layer 204 may lack structural stability. Lens 210 can provide structural stability to film layer 204, but a lens may allow for light bleed between segments, LEDs, and icons. The design of light guide 220 may address the issue of light bleed.

Light guide 220 may include protrusions 222 and 224 that may be configured to be in contact with lens 210 and circuit board 230, respectively. Protrusions 222 may be configured to fit into indents 212 of lens 210. When the wall-mounted control device is assembled, each of protrusions 222 may not be in contact with film layer 204 because indents 212 may not extend through the entire thickness of lens 210. Each of protrusions 222 may be configured to protrude into lens 210 to reduce the thickness of lens 210 that can carry light, for example, between LEDs 234 and 235. When the wall-mounted control device is assembled, protrusions 222 may extend from circuit board 230 to within less than two millimeters, less than one millimeter, or approximately five hundred micrometers from film layer 204.

Light guide 220 and protrusions 222 and 224 may also be referred to as barriers. Light guide 220 and protrusions 222 and 224 may be configured to block or impede light from moving through the interior of the wall-mounted control device. Light guide 220 and protrusions 222 and 224 may include dark colored material that can reduce or prevent the amount of light that passes through or reflects off light guide 220 and protrusions 222 and 224. Light guide 220 and protrusions 224 may be configured to prevent some or all of the light generated by LED 234 from traveling to LED 235 or ambient light sensor 232. This blocking or impede of light may improve the performance of ambient light sensor 232 and may improve the appearance of the icons illuminated on film layer 204.

Optional protrusions 224 may be configured to set the main frame of light guide 220 off circuit board 230 and create an air gap between lens 210 and circuit board 230. In examples in which light guide 220 does not include protrusions 224, the frame of light guide 220 may be able to rest on circuit board 230. Light guide 220 may include a material such as plastic. When the wall-mounted control device is assembled, the edges of light guide 220 may wrap around circuit board 230 such that circuit board fits within the outer flanges of light guide 220.

Circuit board 230 may include a printed circuit board, a wiring board, and/or any other board for electronic components. Ambient light sensor 232, LEDs 234-236, and temperature sensor 238 may be coupled to circuit board 230. In some examples, circuit board 230 is a two-sided board with components coupled to both sides of the board. When the wall-mounted control device is fully assembled, protrusions 222 and 224 of light guide 220 may block light generated by one of LEDs 234-236 from reaching another light generating (e.g., one of LEDs 234-236) or light sensing component (e.g., ambient light sensor 232). Light guide 220 may include openings (not shown in FIG. 2) that are shaped to create icons on display 202 based on light generated by LEDs 234-236 that passes through the openings.

Case back 240 may include barrier 242 configured to create two or more regions between circuit board 230 and case back 240. A vented region on a first side of barrier 242 may include vent 244. The heat generated by LEDs 234-236 may be able to exit from the vented region through vent 244. In some examples, LEDs 234-236 may be positioned on an opposite surface from the vented region, but the heat generated by LEDs 234-236 may be able to pass through circuit board 230 or be conducted by circuit board 230 (e.g., through the metal of a ground plane in circuit board 230) to the vented region. The region with the LEDs may be airtightly sealed from the vented region, so some air may flow between the LED region and the vented region.

A ventless region on a second side of barrier 242 may include temperature sensor 238 (e.g., a thermistor). Although temperature sensor 238 is shown on an opposite side of circuit board 230 from LEDs 234-236, temperature sensor 238 may be on the same side as LEDs 234-236 in some examples. The ventless region may include double isolation for temperature sensor 238, where there are two barriers between the vented region for LEDs 234-236 and the ventless region for temperature sensor 238. Case back 240 may not include any vents for the ventless region such that air cannot flow from the ventless region to the vented region or to the exterior of wall-mounted control device.

Case back 240 may be configured to directly or indirectly connect to a wall in a building. The wall-mounted control device may include additional components not shown in FIG. 2 that may couple case back 240 to a wall. For example, case back 240 may be configured to couple to a wall plate that can couple to a wall. The wall plate may include a first side configured to couple to the wall and a second side configured to couple to the case back, where the second side is opposite from the first side. Additional example details of how to connect a case back to a wall are described in commonly assigned U.S. Pat. No. 10,859,281, entitled "Thermostat Assembly with Removable Trim Ring," issued on Dec. 8, 2020, the entire contents of which are incorporated herein by reference.

Figure 3:
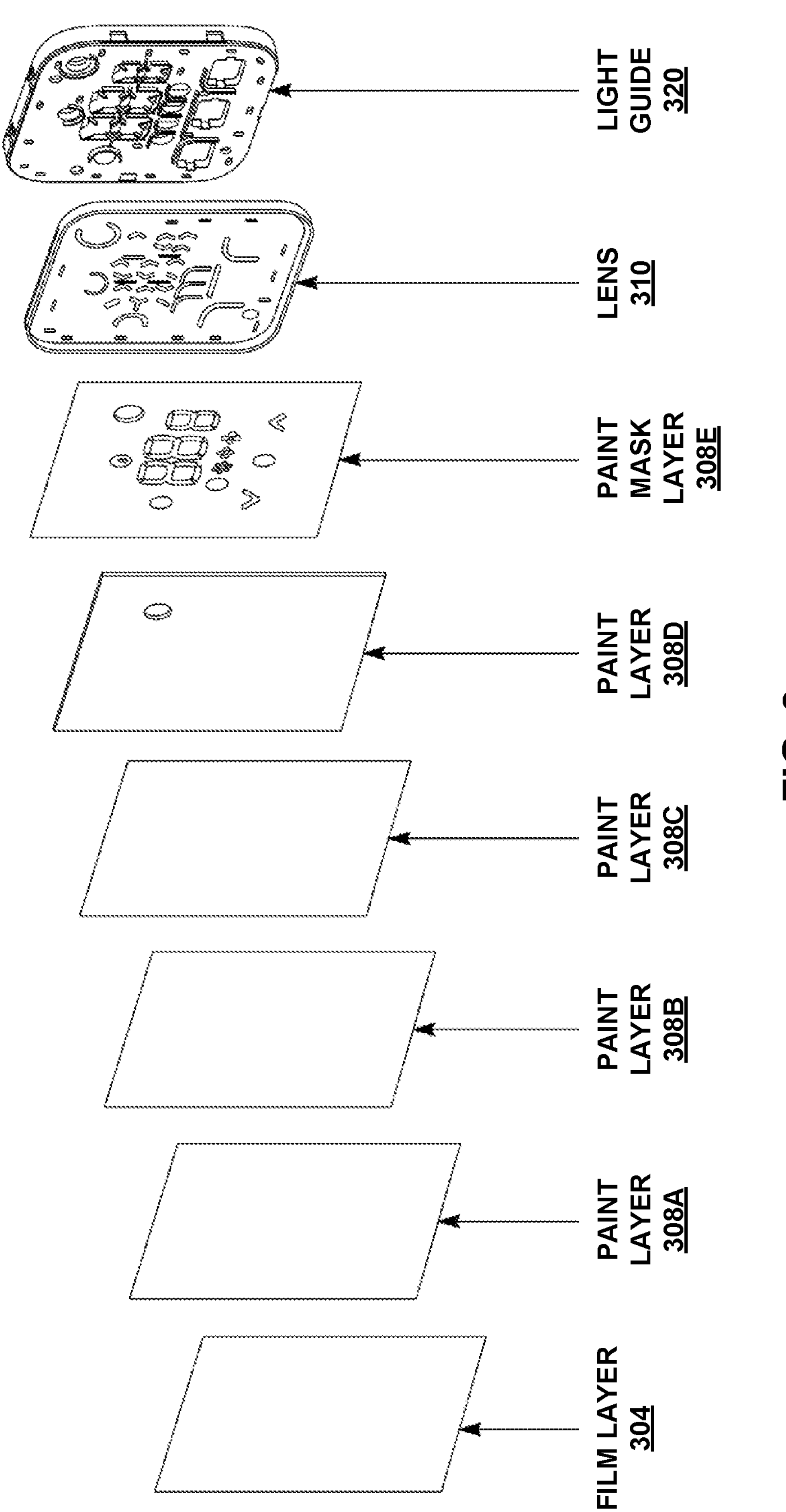
FIG. 3 is an exploded view diagram of a film layer, a lens, and a light guide, in accordance with one or more techniques described herein.

FIG. 3 is an exploded view diagram of a film layer 304, a lens 310, and a light guide 320, in accordance with one or more techniques described herein. In the example shown in FIG. 3, the interior surface of film layer 304 has five layers 308A-308E of paint. Paint layers 308A-308D may include light colored paint, such as white paint. In some examples, light colored may be defined as a color where all three RGB values are greater than one hundred and eighty, greater than two hundred, greater than two hundred and ten, greater than two hundred and twenty, greater than two hundred and thirty, or greater than two hundred and forty.

Paint mask layer 308E may include dark colored paint, such as black paint. In some examples, dark colored may be defined as a color where all three RGB values are less than one hundred and fifty, less than one hundred and twenty, less than one hundred, less than eighty, less than seventy, or less than sixty. Paint mask layer 308E may not be visible to the user because of paint layers 308A-308D between paint mask layer 308E and the front surface of the wall-mounted control device.

Paint layers 308A-308C may cover all or substantially all of film layer 304. Paint layer 308D covers most of film layer 304, except for an area that corresponds to an ambient light sensor. FIG. 3 shows a circular opening in paint layer 308D, a diameter of which may be greater than five, eight, ten, twelve, or fifteen millimeters. In some examples, there may be additional or fewer than four layers of light colored paint on film layer 304.

Paint layers 308A-308D of light colored paint may be configured to disperse, attenuate, and/or impede ambient light received by film layer 304. Paint layers 308A-308D of light colored paint may be configured to impede the ambient light by more than fifty percent, more than seventy percent, more than eighty percent, more than ninety percent, or more than ninety-five percent as the light pass from outside of the wall-mounted control device through film layer 304, paint layers 308A-308D, and lens 310 to the ambient light sensor. Lens 310 may be at least partially translucent so that ambient light causes lens 310 to glow, and the ambient light sensor will sense the brightness of lens 310, rather than the brightness of the room.

Multiple coats of light colored paint may cause the light received by an ambient light sensor to depend on the intensity or brightness of light, rather than the direction from which the light is received. Thus, the ambient light sensor may have a wider field of view where multiple coats of light colored paint are used. For example, the location of a light source within will have very little effect on the brightness of light sensed by the ambient light sensor because paint layer 308A-308D can disperse the ambient light. Thus, even if the orientation of a first light source is different by more than thirty, more than forty, more than sixty, more than ninety, more than one hundred, or more than one hundred and thirty degrees, as compared to a second light source, the amount of light received by the ambient light sensor may be substantially the same, assuming that the intensity emitted by the first and second light sources are equal.

In the example shown in FIG. 3, paint mask layer 308E is the top layer of paint, such that paint mask layer 308E is more interior than paint layers 308A-308D. Paint mask layer 308E may include openings for allowing light generated by the LEDs of the wall-mounted control device to pass from lens 310 to film layer 304. Where paint mask layer 308E does not include an opening for light to pass, paint mask layer 308E may block light from passing from lens 310 to film layer 304. Thus, paint mask layer 308E may give shape to the icons illuminated on film layer 304. Paint mask layer 308E may also include an opening that allows light to pass from film layer 304 through lens 310 to an ambient light sensor.

Light guide 320 may also include openings for allowing light generated by the LEDs of the wall-mounted control device to pass through light guide 320 to lens 310. Light guide 320 may include an opening that allows light to pass from film layer 304 through lens 310 and light guide 320 to an ambient light sensor. Light guide 320 may also include ribs, walls, or barriers that extend from light guide 320 into lens 310. Lens 310 may have indents that receive or accommodate the ribs, walls, or barriers of light guide 320. In the example shown in FIG. 3, light guide 320 includes three openings for three conductive elements that can be attached to a circuit board and can press against lens 310. These conductive elements may be configured to receive user input via a capacitive touch screen, in some examples.

Figure 4A:
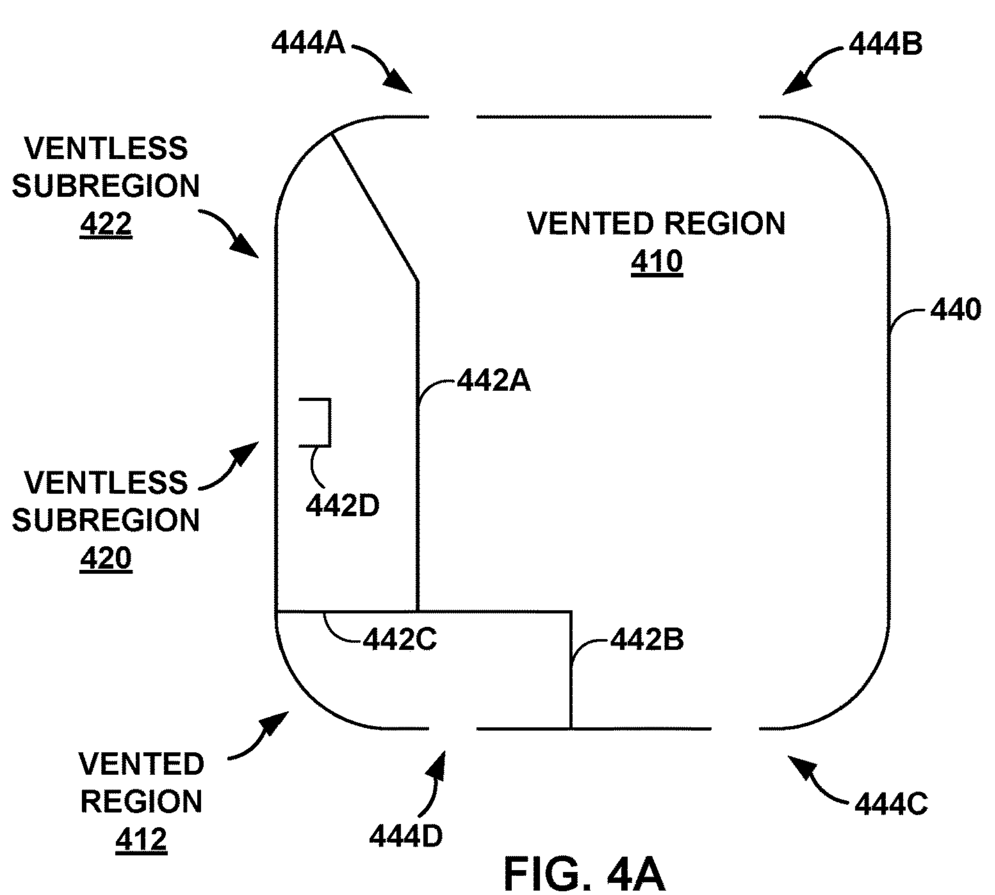
FIG. 4A is a diagram of vented regions and ventless regions of an example wall-mounted control device, in accordance with one or more techniques described herein.

FIG. 4A is a diagram of vented regions 410 and 412 and ventless subregions 420 and 422 of an example wall-mounted control device, in accordance with one or more techniques described herein. The wall-mounted control device shown in FIG. 4A is a vented device, but at least one temperature sensor may be positioned in ventless subregion 420 or 422. Barriers 442A-442D may be part of and/or joined to the interior of case back 440. In some examples, case back 440 and barriers 442A-442D may include a material with low thermal conductivity such as plastic, paperboard, or fiberglass. When the wall-mounted control device is assembled, barriers 442A-442D may prevent air flow among regions 410, 412, 420, and 422. Each of barriers 442A-442D may have a width of less than four millimeters, less than three millimeters, less than two millimeters, or less than one millimeter. Each of barriers 442A-442D may extend from case back 440 more than five millimeters, more than seven millimeters, more than ten millimeters, more than twelve millimeters, more than fifteen millimeters, or more than twenty millimeters.

Although described as preventing air flow among regions 410, 412, 420, and 422, the wall-mounted control device may not be completely airtight. Instead, the air flow through vents 444A-444D may be substantially greater than the air flow through among regions 410, 412, 420, and 422 (e.g., through or around barriers 442A-442D). For example, the air flow through one of vents 444A-444D may be two times, three times, five times, ten times, or twenty times greater than the air flow between regions 410 and 412, between regions 410 and 420, between regions 412 and 420, or between ventless subregions 420 and 422. The cross-sectional area of one of vents 444A-444D may be two times, three times, five times, ten times, or twenty times greater than any air gaps that allow air flow directly among regions 410, 412, 420, and 422. Thus, the term "prevent air flow" may mean that the air flow through one of vents 444A-444D may be two times, three times, five times, ten times, or twenty times greater than the air flow directly between any two of regions 410, 412, 420, and 422.

Vented region 410 may be bounded by case back 440 and barriers 442A and 442B. When the wall-mounted control device is assembled, vented region 410 may include LEDs and other heat-generating components, such as a wireless transceiver. The wall-mounted control device may also include relays, processing circuitry, and power supplies that dissipate heat during operation. These heat generating components make it difficult to sense the ambient temperature. Thus, preventing air flow between regions 410, 412, 420, and 422 may limit the effect of the heat generated inside the wall-mounted control device on sensors 438 and 448. A second temperature sensor (not shown in FIG. 4A or 4B) may be present in vented region to monitor the heat generated by the components on circuit board 430. The device may include processing circuitry configured to determine or estimate the ambient temperature based on the sensed temperatures using temperature compensation techniques.

Heat dissipation and venting may be especially important for wall-mounted control devices because the wall side of the device is blocked by the wall and the user-facing side of the device may not have vents because vents would detract from the aesthetics of the device. The device may have a thin profile, which limits the room for heat to flow out of the device and limits air flow. Unlike a mobile computing device, the device is stationary and mounted to the wall inside a building, so there is no wind or air flow.

Air can flow via vents 444A-444C between vented region 410 and outside of the wall-mounted control device. Vents 444A and 444B are positioned on a first side of case back 440, and vent 444C is positioned on a second side of case back 440. The second side may be on an opposite side of case back from the first side. A first normal vector of the first side may be at least ninety degrees, at least one hundred and twenty degrees, or at least one hundred and fifty degrees away from a second normal vector of the second side. In the example shown in FIG. 4A, the first normal vector points upwards, and the second normal vector points downwards, so these normal vectors are one hundred and eighty apart. Vented region 412 may be bounded by case back 440 and barriers 442B and 442C.

When the wall-mounted control device is assembled, vented region 412 may include a humidity sensor. Air can flow via vent 444D between vented region 412 and outside of the wall-mounted control device. In the example shown in FIG. 4A, vented region 412 is adjacent to regions 410 and

420. Vented region 412 may also include a temperature sensing to monitor the temperature in region 412.

Ventless subregions 420 and 422 may be part of a ventless region that is bounded by case back 440 and barrier 442D. Ventless subregion 420 may be bounded by case back 440 and barriers 442A, 442C, and 442D. Ventless subregion 422 may be bounded by case back 440 and barrier 442D. Ventless subregion 422 may also be bounded by a portion of the light guide and/or a portion of the display that folds down to close off the fourth wall of ventless subregion 422. Ventless subregions 420 and 422 may be free from the influence of convection or air flow.

In the example shown in FIG. 4A, ventless subregion 420 is adjacent to regions 410, 412, and 422. When the wall-mounted control device is assembled, ventless subregion 420 may include a temperature sensor. There are no vents for air to move between ventless subregion 420 or 422 and outside of the wall-mounted control device. The wall-mounted control device may include thermally conductive material such as foam in ventless subregion 422 so that the temperature in ventless subregion is more closely linked to the ambient temperature.

FIG. 4A depicts barrier 442D as not extending to the outer wall of case back 440, but barrier 442 may extend to the outer wall of case back 440. Case back 440 may have a curved shape, and the circuit board may fit in case back 440 such that ventless subregion 422 is sealed off from ventless subregion 420. Ventless subregion 422 may be a double-isolation region with two barriers between ventless subregion 422 and vented region 410 or 412. For example, barriers 442A and 442D prevent air flow between ventless subregion 422 and vented region 410, and barriers 442A and 442C prevent air flow between ventless subregion 422 and vented region 412.

The temperature within ventless subregion 422 may be related to the ambient temperature (e.g., the temperature outside of the wall-mounted control device) and to the temperature in vented region 410 or 412. Processing circuitry may be configured to determine the ambient temperature based on a first temperature sensed in ventless subregion 422 and a second temperature sensed in vented region 410. Additional example details of determining an ambient temperature based on sensed temperature(s) (e.g., temperature compensation techniques) are described in commonly assigned U.S. Pat. No. 8,280,673, entitled "System for Determining Ambient Temperature," issued on Oct. 2, 2012, the entire contents of which are incorporated herein by reference.

Another wall-mounted control device may include one or more vents for allowing ambient air to flow into a region in the device that has a temperature sensor. However, the temperature sensor in a vented region may still be affected by the heat generated by LEDs, even if there is a barrier between the temperature sensor and the LEDs. By positioning a temperature sensor in ventless region 420 or 422, processing circuitry of the wall-mounted control device may be configured to determine the ambient temperature based on the relationship between the sensed temperatures in regions 410, 412, 420, and/or 422.

Using the techniques of this disclosure may allow for more accurate temperature sensing, which may be desirable for wall-mounted control devices such as thermostats and other building control devices. An inaccurate measurement of the ambient temperature can result in inefficient operation because the wall-mounted control device may activate heating or cooling even when the ambient temperature is equal to the setpoint selected by the user.

Figure 4B:
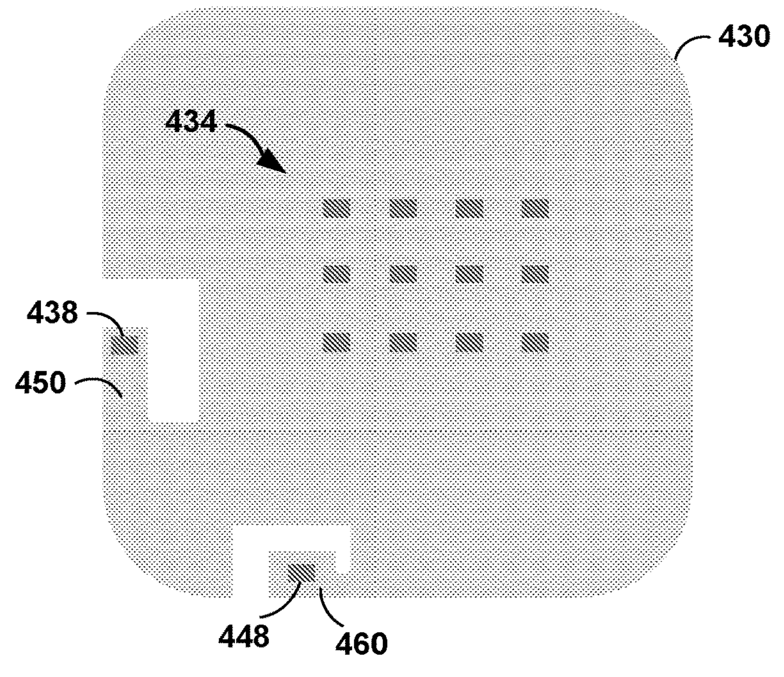
FIG. 4B is a diagram of a temperature sensor and a humidity sensor attached to an example circuit board, in accordance with one or more techniques described herein.

FIG. 4B is a diagram of a temperature sensor and a humidity sensor attached to an example circuit board 430, in accordance with one or more techniques described herein. To assemble the wall-mounted control device, circuit board 430 may be laid on top of barriers 442A-442D. Components 434, 438, and 448 may include surface-mount components, through-hole components, and/or any other type of components. When the wall-mounted control device is assembled, LEDs 434 may be positioned in vented region 410, temperature sensor 438 may be positioned in ventless subregion 422, and humidity sensor 448 may be positioned in vented region 412. When the wall-mounted control device is assembled, circuit board 430 may form a seal with case back 440 and barriers 442A-442D. There may be additional heat generating components that are attached to a portion of circuit board 430 that is away from barriers 442A and 442B to avoid heat conducting through barriers 442A and 442B.

Circuit board 430 may include protruding portions 450 and 460 to reduce the heat conducted from the first, main portion of circuit board 430 to sensors 438 and 448. Temperature sensor 438 may be attached to portion 450, and humidity sensor 448 may be attached to portion 460. Circuit board 430 may include two or more humidity sensors attached to protrusion 460. The length of portion 450 may be at least twice the width of portion 450 to reduce the heat conducted from the first, main portion of circuit board 430 to sensor 438. In some examples, circuit board 430 includes only one or two traces on protrusion 450 to connect to temperature sensor 438. Heat can move through circuit board 430, so the shape for circuit board 430 can reduce the thermal coupling between LEDs 434 and temperature sensor 438, as compared to a temperature sensor on a rectangular shaped circuit board.

Figure 5:
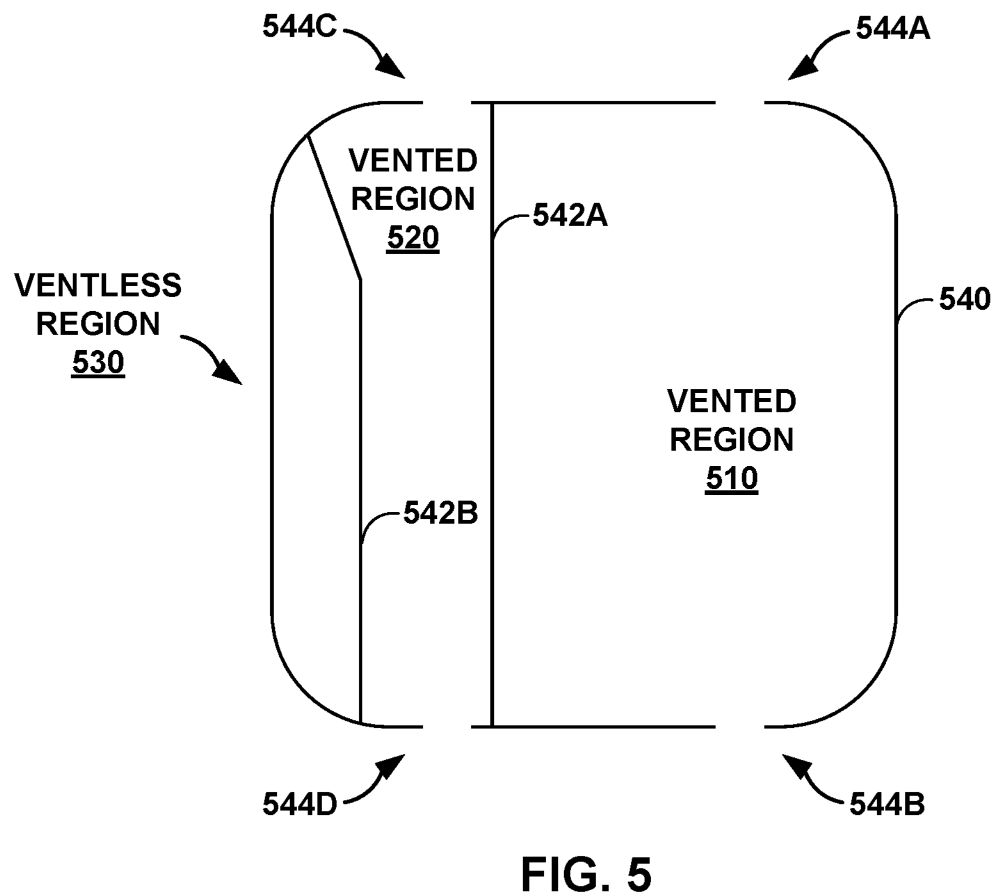
FIG. 5 is a diagram of two vented regions and one ventless region of an example wall-mounted control device, in accordance with one or more techniques described herein.

FIG. 5 is a diagram of two vented regions 510 and 520 and one ventless region 530 of an example wall-mounted control device, in accordance with one or more techniques described herein. FIG. 5 shows alternative to case back 440 shown in FIG. 4A. Barriers 542A and 542B may be part of and/or joined to the interior of case back 540. In some examples, case back 540 and barriers 542A and 542B may include a material with low thermal conductivity such as plastic or fiberglass. When the wall-mounted control device is assembled, barriers 542A and 542B may prevent air flow among regions 510, 520, and 530.

Vented region 510 may be bounded by case back 540 and barrier 542A. When the wall-mounted control device is assembled, vented region 510 may include LEDs and other heat-generating components. Air can flow via vents 544A and 544B between vented region 510 and outside of the wall-mounted control device. Vents 544A and 544C are positioned on a first side of case back 540, and vents 544B and 544D are positioned on a second side of case back 540. The second side may be on an opposite side of case back from the first side. A normal vector of the first side may be at least ninety degrees, at least one hundred and twenty degrees, or at least one hundred and fifty degrees away from a normal vector of the second side.

Vented region 520 may be bounded by case back 540 and barriers 542A and 542B. When the wall-mounted control device is assembled, vented region 520 may include a humidity sensor. Air can flow via vents 544C and 544D between vented region 520 and outside of the wall-mounted control device. Ventless region 530 may be bounded by case back 540 and barrier 542B. When the wall-mounted control device is assembled, ventless region 530 may include a temperature sensor. There are no vents for air to move between ventless region 530 and outside of the wall-mounted control device.

The temperature within ventless region 530 may be related to the ambient temperature (e.g., the temperature outside of the wall-mounted control device) and to the temperature in vented region 510 or 520. Processing circuitry may be configured to determine the ambient temperature based on a first temperature sensed in ventless region 530 and a second temperature sensed in vented region 510.

Figure 6:
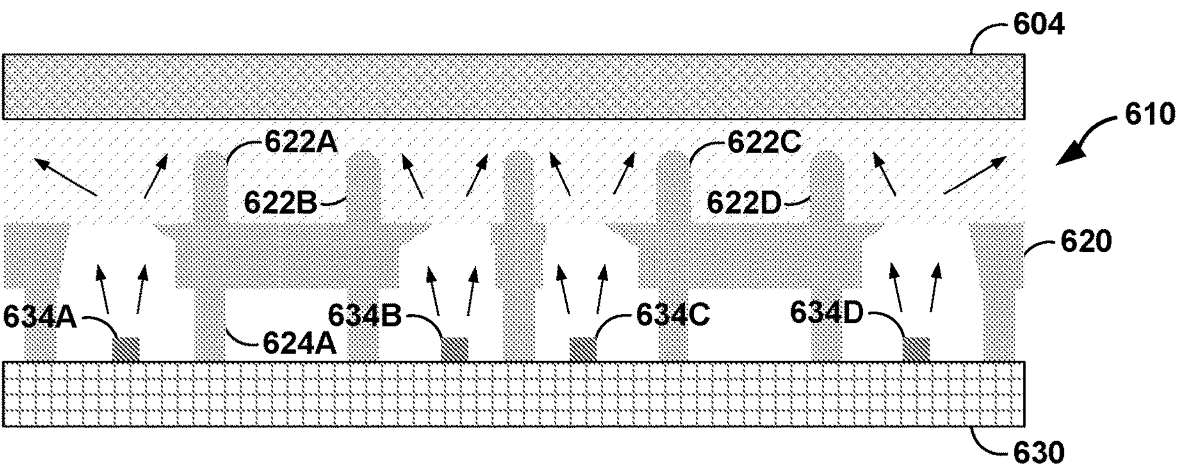
FIG. 6 is a side-view diagram of a light guide with ribs positioned between a lens and a circuit board, in accordance with one or more techniques described herein.

FIG. 6 is a side-view diagram of a light guide 620 with ribs 622A-622D positioned between a lens 610 and a circuit board 630, in accordance with one or more techniques described herein. Although not shown in FIG. 6, the surface of film layer 604 that faces lens 610 may have a dark colored paint mask layer with openings to form the shape of icons on film layer 604. The mask layer on film layer 604 may also reduce the reflection and bouncing of light off film layer 604 because of the dark color of the mask layer. The gap between lens 610 and circuit board 630 may be filled with air.

Light guide 620 may include ribs 622A-622D that impede the horizontal movement of light through lens 610. Each of ribs 622A-622D may extend from light guide 620 into lens 610. In some examples, each of ribs 622A-622D may extend into lens 610 more than thirty percent, more than fifty percent, or more than seventy percent of the thickness of lens 610. For example, each of ribs 622A-622D may extend more than one millimeter out from light guide 620, and the total thickness of lens 610 may be less than four millimeters, less than three millimeters, or less than two millimeters.

Light guide 620 may have a dark color that prevents light from moving through light guide 620. Light guide 620 and circuit board 630 may prevent the light generated by LEDs 634A-634D from moving horizontally towards other LEDs. For example, light guide 620 may include pillar 624A in contact with circuit board 630, where pillar 624A blocks the movement of light in directions parallel to the surface of circuit board 630. Although FIG. 6 depicts pillar 624A as aligned with rib 622A, some or all of the pillars may not be aligned with a respective rib. The structure of light guide 620, including rib 622A and pillar 624A, may be referred to as a barrier that impedes light from traveling between LEDs 634A and 634B. Rib 622A, pillar 624A, and the overall structure of light guide 620 presents a barrier to the movement of light generated by LED 634A to LED 634B.

LED 634A may be configured to generate light that travels through the air gap, lens 610, and film layer 604. Ribs 622A and 622B may protrude into lens 610 and impede the movement of the light generated by LED 634A from moving towards LED 634B. The dark color of light guide 620, ribs 622A and 622B, pillar 624A, and/or the dark colored mask layer on film layer 604 may prevent the movement of light generated by LED 634A towards LED 634B. Preventing this movement of light reduces the light bleed between icons on a display formed by film layer 704, which may make the icons crisper and more distinct.

Thus, in examples in which the device causes LED 634A to illuminate an icon, adjacent icons are not illuminated to extent that may occur for a light guide without ribs. In simulations and testing, a reduction in light bleed from two percent to one percent was achieved for an example device by increasing the number of ribs and/or increasing the size of the ribs (length, width, and/or height). A reduction in light bleed may result in less confusion by a user with respect to which icon is being illuminated. The reduction in light bleed may be especially useful for colored icons (e.g., a blue icon next to a red icon) so that the user does not become confused about the intended color for each icon.

Figure 7:
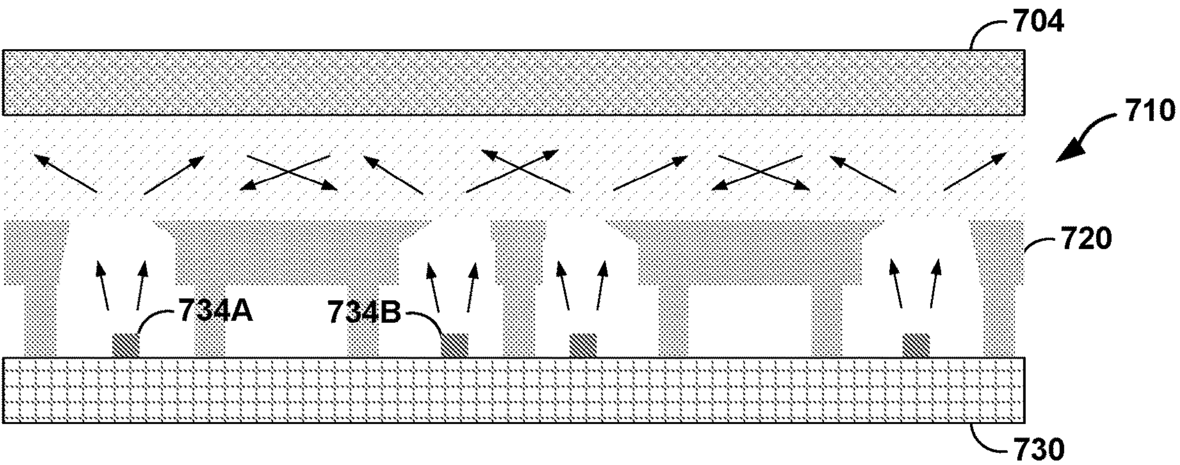
FIG. 7 is a side-view diagram of a light guide positioned between a lens and a circuit board.

FIG. 7 is a side-view diagram of a light guide 720 positioned between a lens 710 and a circuit board 730. Unlike light guide 620 shown in FIG. 6, light guide 720 does not include ribs that protrude into lens 710. The light generated by LED 734A is able to travel through lens 710 towards LED 734B. Thus, in examples in which the device causes LED 734A to illuminate an icon, adjacent icons are also illuminated. The illumination of adjacent icons may worsen the user experience because, for example, the user may be unable to discern which icon should be illuminated.

Figures 8A, 8B:
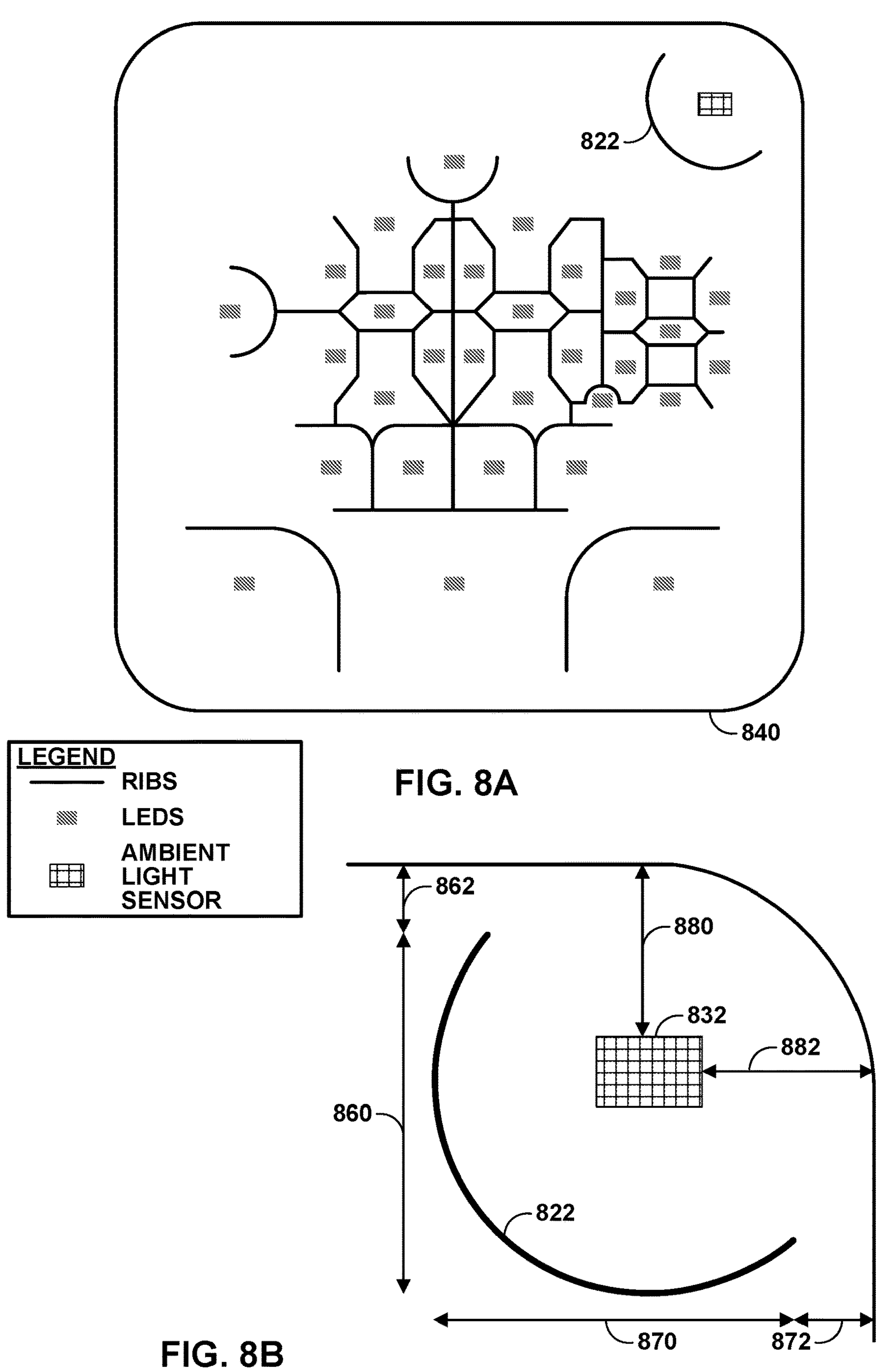
FIGS. 8A and 8B are front-view diagrams of the light emitting diodes and the ribs of a light guide, in accordance with one or more techniques described herein.

FIGS. 8A and 8B are front-view diagrams of the light emitting diodes and the ribs of a light guide, in accordance with one or more techniques described herein. FIG. 8A shows an example arrangement of ribs (e.g., barriers) on a light guide based on the arrangement of icons depicted on display 102 shown in FIG. 1. Some of the LEDs shown in FIG. 8A may be entirely surrounded by ribs in all horizontal directions, while other LEDs have ribs on two or three sides with an opening on one or more sides. Although FIG. 8 shows a single LED for each segment of the seven-segment displays, the wall-mounted control device may include two LEDs for each segment of the two large seven-segment displays.

FIG. 8B is a zoomed-in version of FIG. 8A. Ambient light sensor 832 shown in FIGS. 8A and 8B is located in a corner, away from the LEDs and bounded on two sides by C-shaped rib 822. Additionally or alternatively, ambient light sensor 832 may be bounded by an L-shaped rib, a semicircular rib, or a polygonal rib. Case back 840 also bounds ambient light sensor 832 on two sides. Even though there are gaps between case back 840 and rib 822 on two sides, light generated by the LEDs may not reach ambient light sensor 832. In other words, rib 822 may prevent more than eighty percent, more than ninety percent, more than ninety-five percent, more than ninety-eight percent, or more than ninety-nine percent of the light generated by the LEDs from reaching ambient light sensor 832. In simulations and testing, a reduction in light bleed from two percent to one percent was achieved for an example device by increasing the number of ribs and/or increasing the size of the ribs (length, width, and/or height).

In some examples, the dimensions of case back 840 are between five and twenty centimeters. The total length of rib 822 may be in a range bounded by one and six centimeters or in a range bounded by two centimeters and five centimeters. The width of rib 822 may be less than three millimeters, less than two millimeters, less than fifteen hundred micrometers, or less than one millimeter. Horizontal dimensions 860 and 870 of rib 822 may be in a range bounded by eight and fifty millimeters or in a range bounded by fifteen and forty millimeters. Horizontal distances 862 and 872 between rib 822 and case back 840 may be less than fifteen millimeters, less than ten millimeters, or less than eight millimeters. Horizontal distances 880 and 882 between ambient light sensor 832 and case back 840 may be less than three millimeters, less than two centimeters, or less than fifteen millimeters.

Rib 822 may partially or fully surround ambient light sensor 832 to impede light generated by the LEDs from reaching ambient light sensor 832. Even in examples in which rib 822 does not extend through the lens to the film layer, rib 822 may be able to block more than fifty percent, more than eighty percent, more than ninety percent, more than ninety-five percent, or more than ninety-eight percent of the light generated by the LEDs. Even in examples in which rib 822 does not extend to case back 840, rib 822 may be able to block more than fifty percent, more than eighty percent, more than ninety percent, more than ninety-five percent, or more than ninety-eight percent of the light generated by the LEDs. Blocking the light generated by the LEDs from reaching ambient light sensor 832 may result in a more accurate determination of the brightness of the ambient light.

Figure 9A:
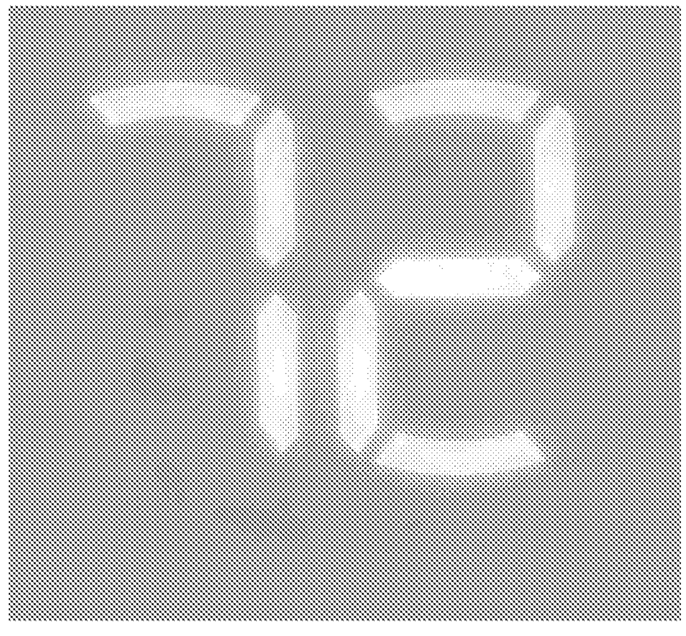
FIGS. 9A and 9B are images showing the effect of light-guide ribs on light bleed.
Figure 9B:
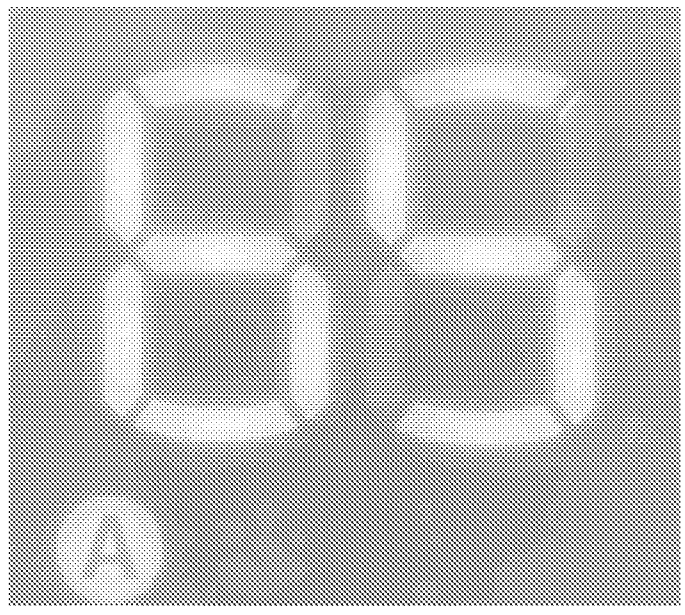

FIGS. 9A and 9B are images showing the effect of light-guide ribs on light bleed. The number "72" shown in FIG. 9A is an example of a display with eight illuminated icons: three segments for the number seven, and five segments for the number two. There are six segments that are not illuminated: four segments for the number seven, and two segments for the number two. These six unilluminated segments are not visible in FIG. 9A.

The number "65" shown in FIG. 9B is an example of a display with twelve illuminated icons: six segments for the number six, five segments for the number five, and the "A" icon adjacent to the number six. There are three segments that are not illuminated: one segment for the number six, and two segments for the number five. These three unilluminated segments are faintly visible in FIG. 9B. The decimal point adjacent the number five is also faintly visible. Thus, the segments should be deactivated may appear to be partially or fully illuminated.

The display shown in FIG. 9A may be crisper, have higher perceived quality, and be more usable than the display shown in FIG. 9B. Usability and crispness may be especially important for visually impaired users. A visually impaired user may have difficulty discerning the information outputted by a wall-mounted control device if the icons on a display are blurry. Therefore, reducing the light that bleeds between LEDs may improve the user experience.

Figure 10A:
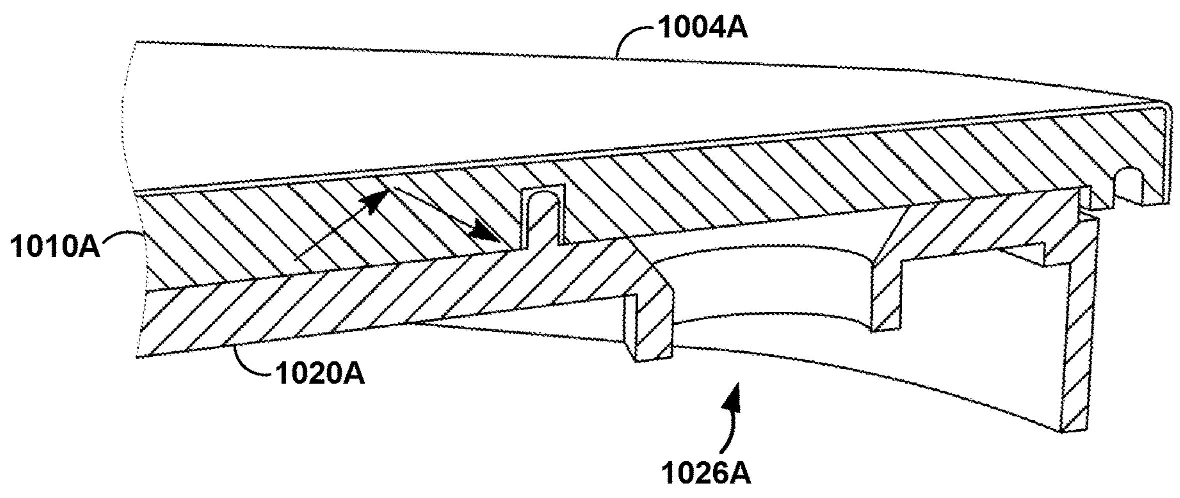
FIGS. 10A and 10B are cutaway side-view diagrams of light passing through a lens in contact with a light guide.
Figure 10B:
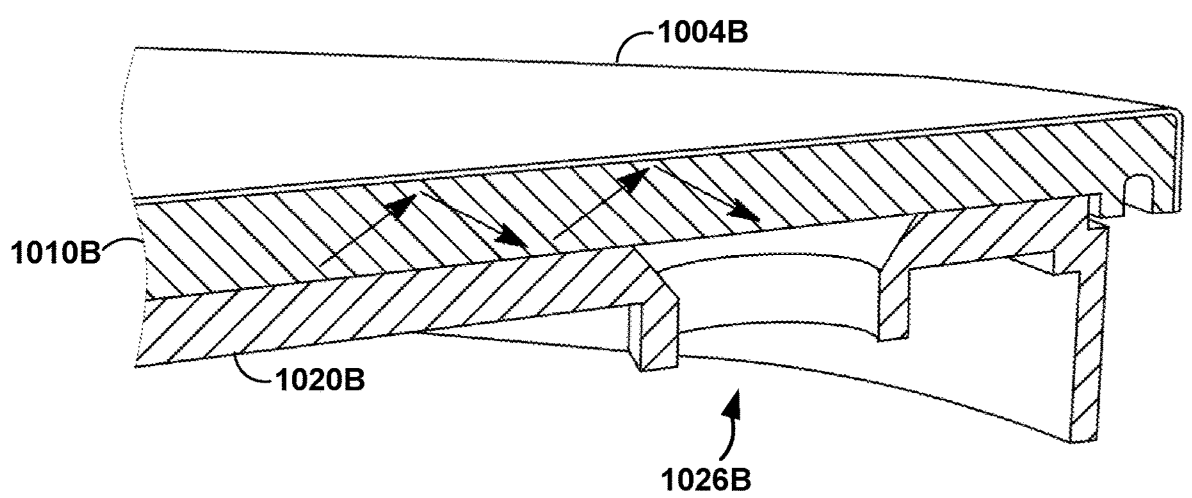

FIGS. 10A and 10B are cutaway side-view diagrams of light passing through a lens in contact with a light guide. Lens 1010A includes an indent for receiving a rib (e.g., barrier) of light guide 1020A that protrudes into lens 1010A. In the example shown in FIG. 10A, light is passing through lens 1010A by reflecting off the paint on the interior surface of film layer 1004A and reflecting off light guide 1020A. The light may be generated by an LED that is not shown in FIG. 10A. The rib of light guide 1020A impedes light from passing through lens 1010A to opening 1026A in light guide 1020A. Opening 1026A may allow ambient light to pass from film layer 1004A and lens 1010A to an ambient light sensor that is not shown in FIG. 10A.

As shown in FIGS. 10A and 10B, there are two sections of openings 1026A and 1026B. A first section of openings 1026A and 1026B that is adjacent lenses 1010A and 1010B has a conical shape. That is, light guides 1020A and 1020B have a conical shape in the first section to form openings 1026A and 1026B. The diameter of the conical shape decreases away from lenses 1010A and 1010B. A second section of openings 1026A and 1026B that is adjacent a circuit board (not shown in FIGS. 10A and 10B) has a cylindrical shape. That is, light guides 1020A and 1020B have a cylindrical shape in the second section to form openings 1026A and 1026B. In some examples, the entire height of openings 1026A and 1026B may have a conical or cylindrical shape.

The rib of light guide 1020A is shown in FIG. 10A to partially protrude into lens 1010A but not to make contact with film layer 1004A. Lens 1010A may have a nominal thickness of more than one millimeter, more than fifteen hundred micrometers, and/or approximately two millimeters. At a portion of lens 1010A that has an indent, lens may have a thickness that is less than fifteen hundred micrometers, less than one millimeter, less than five hundred micrometers, and/or approximately five hundred micrometers. At a portion of lens 1010A that has an indent, lens may have a thickness that is less than seventy percent of the nominal thickness of lens 1010A, less than fifty percent of the nominal thickness of lens 1010A, less than forty percent of the nominal thickness of lens 1010A, or less than thirty percent of the nominal thickness of lens 1010A.

The light-guide rib shown in FIG. 10A may reduce the amount of light generated by an LED that reaches the ambient light sensor. Thus, the light sensed by the ambient light sensor may be based on the brightness of the ambient light with less influence from light generated by LEDs in the wall-mounted control device, as compared to light guide 1120B shown in FIG. 10B.

In the example shown in FIG. 10B, light guide 1020B does not include a rib protrudes into lens 1010B. When light passes through lens 1010B, the light reflects off the paint on the interior surface of film layer 1004B and reflects off light guide 1020B. The light may be generated by an LED that is not shown in FIG. 10B. Without a rib to impede light from passing through lens 1010B, the light can reach opening 1026B in light guide 1020B. By reaching opening 1026B, the light may increase the brightness of light sensed by an ambient light sensor (not shown in FIG. 10B).

Figure 11:
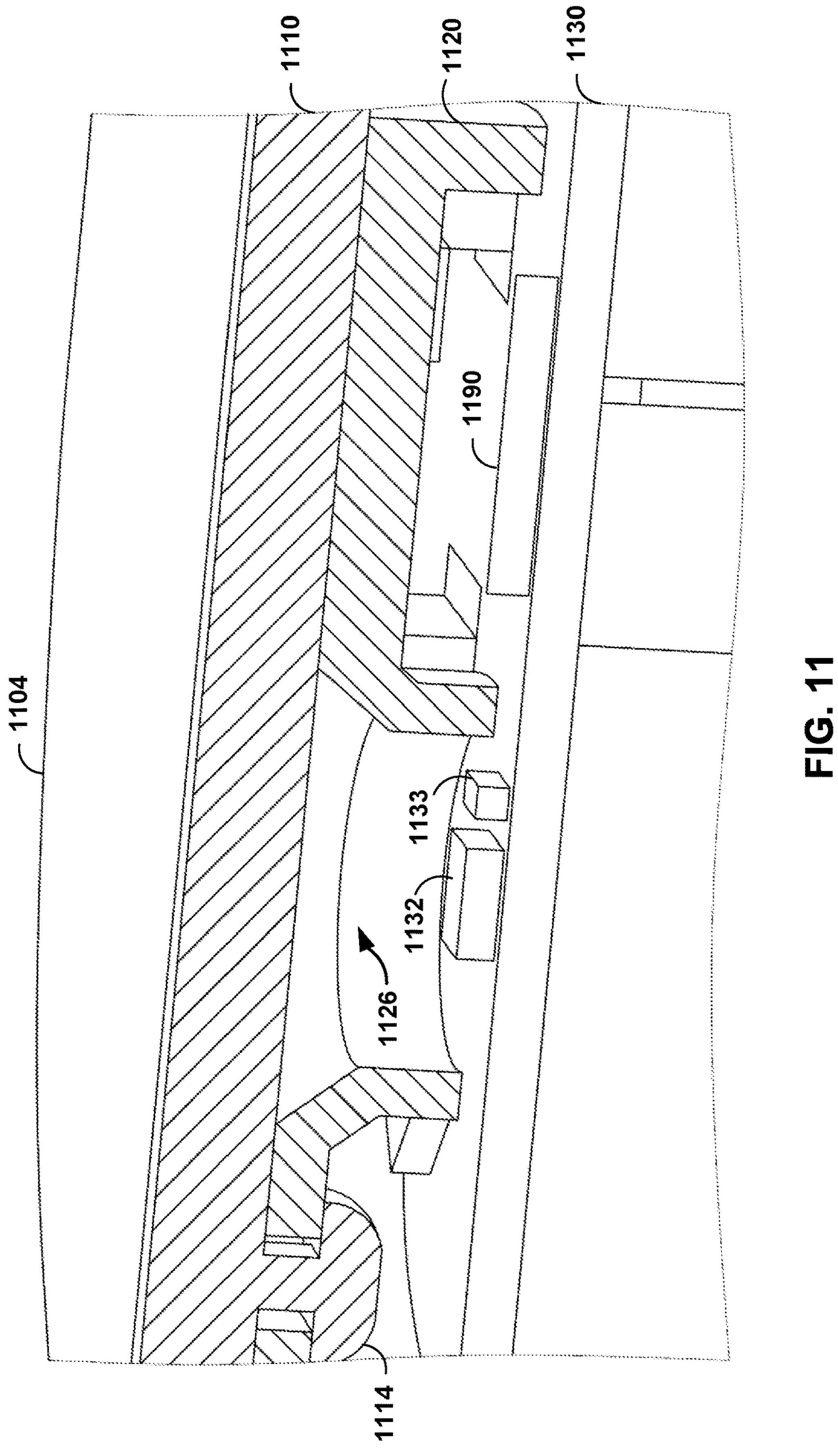
FIG. 11 is a cutaway side-view diagram of an ambient light sensor positioned behind a display lens, in accordance with one or more techniques described herein.

FIG. 11 is a cutaway side-view diagram of an ambient light sensor 1132 positioned behind a display lens 1110, in accordance with one or more techniques described herein. Ambient light sensor 1132 and another component 1133 are shown to be attached to circuit board 1130. Component 1133 may include a resistor, a capacitor, an integrated circuit, and/or any other component. Component 1190 may include processing circuitry configured to receive a signal outputted by ambient light sensor 1132. In the example shown in FIG. 11, lens 1110 may be attached to light guide 1120 by heat stake 1114. Heat stake 1114 may be able to tightly bind lens 1110 to light guide 1120.

Light guide 1120 includes opening 1126 for allowing light to pass through film layer 1104 and lens 1110 to ambient light sensor 1132. Opening 1126 may have a diameter of greater than three, four, or five millimeters at circuit board 1130. Opening 1126 may have a diameter of greater than six, seven, eight, or ten millimeters at lens 1110.

Opening 1126 may have a larger diameter at lens 1110 where several coats of light paint are applied to the interior surface of film layer 1104, as compared to another device with fewer coats of light paint. The coats of light paint applied to film layer 1104 may conceal opening 1126, allowing for a larger opening 1126, which may improve the ability of ambient light sensor 1132 to detect ambient light. In contrast, another device may have a smaller opening or window to reduce light bleed received by an ambient light sensor. The smaller opening may reduce the ability of the ambient light sensor to detect ambient light. For at least this reason, the light-guide ribs may allow for a larger light-sensor opening without visible light bleed into the opening.

Figure 12:
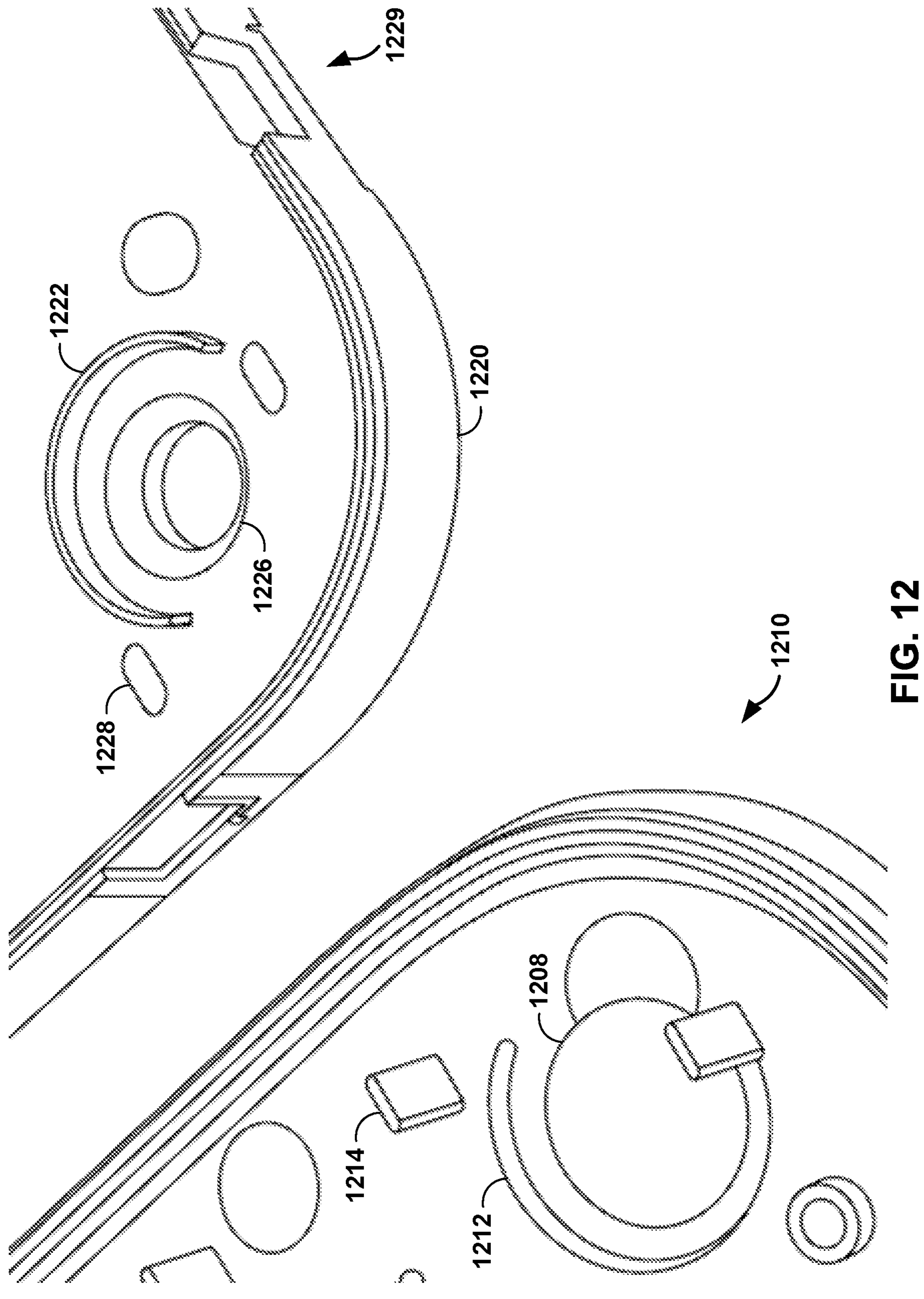
FIG. 12 is a diagram of an unassembled light guide and lens, in accordance with one or more techniques described herein.

FIG. 12 is a diagram of an unassembled light guide 1220 and lens 1210, in accordance with one or more techniques described herein. Lens 1210 may include mask opening 1208, indent 1212, and heat stake protrusion 1214. Light guide 1220 may include C-shaped barrier 1222, opening 1226 for an ambient light sensor, heat stake opening 1228, and vent 1229.

Mask opening 1208 may be a portion of film layer that is not covered by dark colored paint. When the wall-mounted control device is assembled, mask opening 1208 can allow light to pass through the film layer, lens 1210, and opening 1226 of light guide 1220 to reach an ambient light sensor. Mask opening 1208 may line up with opening 1226 to allow light to enter opening 1226. Opening 1226 is shown in FIG. 12 as having a wider diameter where light guide 1220 will be in contact with lens 1210, as compared to the diameter where light guide 1220 will be in contact with a circuit board.

Indent 1212 may be configured to receive barrier 1222 when lens 1210 and light guide 1220 are fitted together. Although indent 1212 and barrier 1222 are shown in FIG. 12 having a C-shape, other shapes are possible for indent 1212 and barrier 1222, such as an L-shape. Barrier 1222 may be shaped to at least partially surround opening 1226 to impede light generated by an LED from reaching opening1226.

When the wall-mounted control device is assembled, heat stake protrusion 1214 may fit into heat stake opening 1228 and hold lens 1210 to light guide 1220. Heat stake protrusion 1214 may be heated and deformed to form a T-shape similar to heat stake 1114 shown in FIG. 11. When the wall-mounted control device is assembled, vent 1229 may line up with a vent in the case back.

Figure 13A:
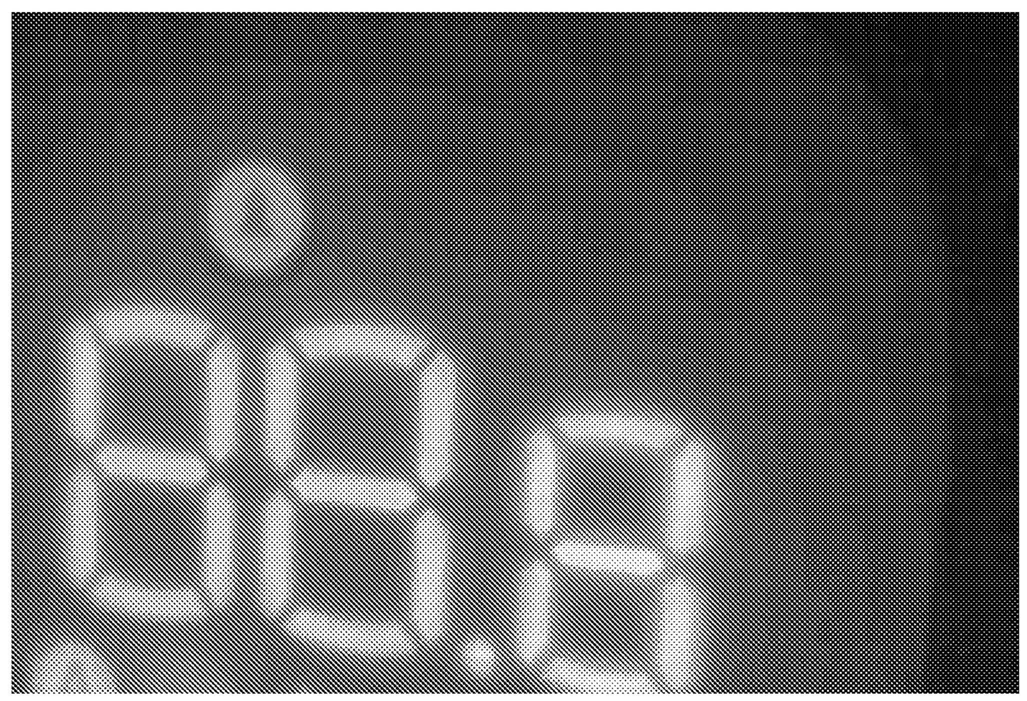
FIGS. 13A and 13B are images showing the effect of light-guide ribs on light bleed.
Figure 13B:
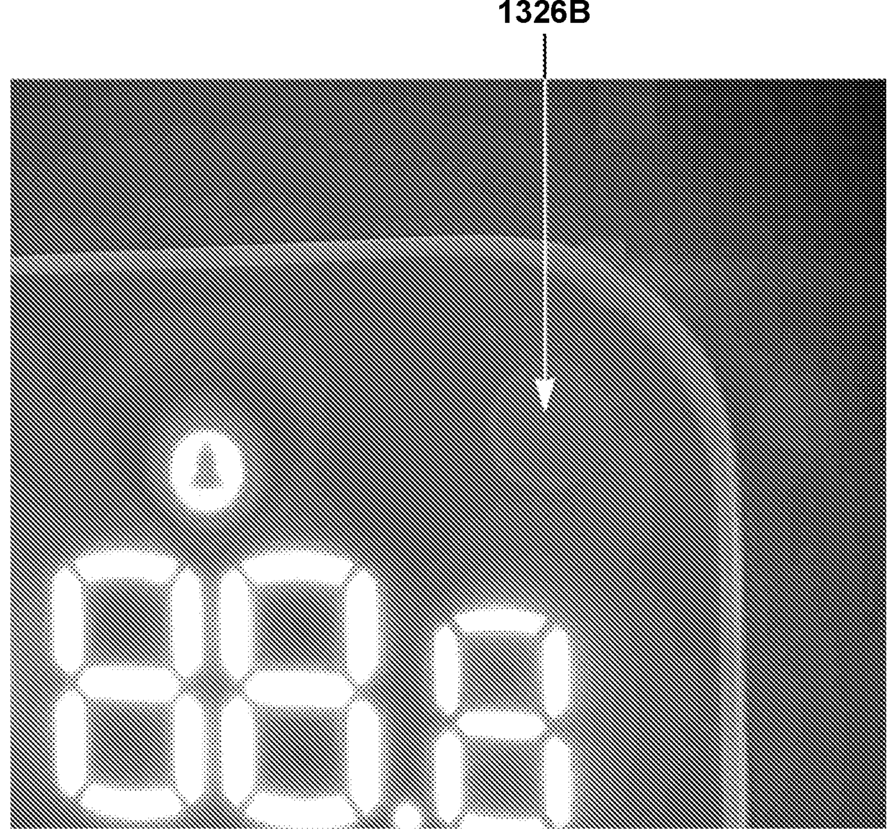

FIGS. 13A and 13B are images showing the effect of light-guide ribs on light bleed. The opening for an ambient light sensor may not be visible, or may be barely visible, in FIG. 13A. Light-guide ribs may impede the light generated by LEDs for the seven-segment displays shown in FIG. 13A from reaching the opening for the ambient light sensor. In contrast, FIG. 13B shows light bleed that has reached the opening for an ambient light sensor. FIG. 13B shows circle 1326B, which is caused by light generated by LEDs travelling through a lens to the opening for the ambient light sensor. This light bleed creates blurriness on the display in FIG. 13A, which can worsen the user experience and cause confusion about whether circle 1326B is an icon or a button. The light bleed may also increase the brightness of light sensed by the ambient light sensor, which may be used by the wall-mounted control device to determine how brightly to illuminate the icons on the display.

The light bleed that is visible in circle 1326B may be most likely to occur in a dark room. To reduce the light bleed that is visible, the brightness of the icons can be reduced. But to reduce the brightness of the icons in a dark room, the wall-mounted control device should have an accurate reading from the ambient light sensor. If the icons are too bright for the room, the light illuminating the icons may bleed into the ambient light sensor opening, causing the wall-mounted control device to maintain the brightness of the icons because the ambient light sensor is detecting bright light.

Figures 14A, 14B:
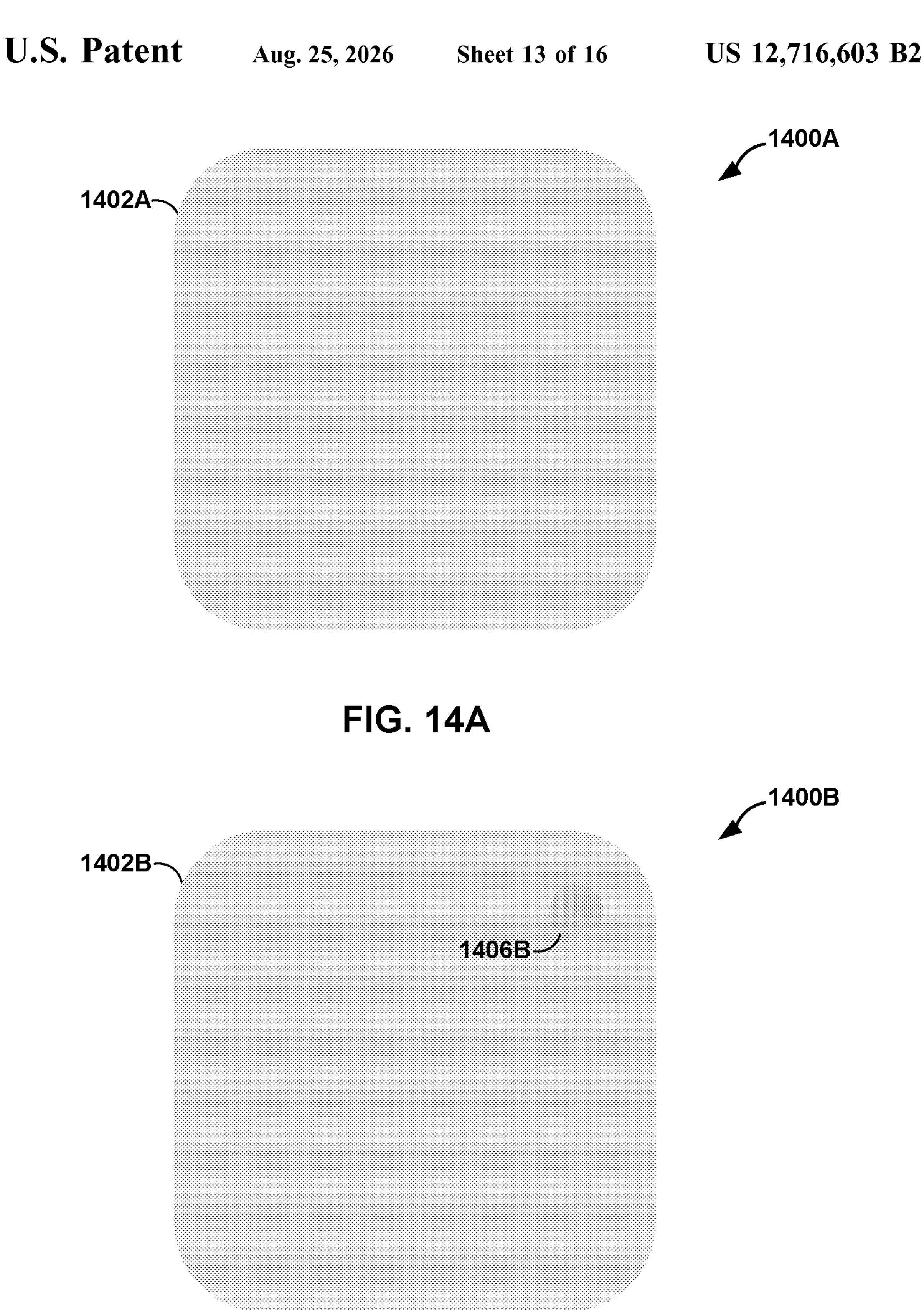
FIGS. 14A and 14B are diagrams of displays on wall-mounted control devices.

FIGS. 14A and 14B are diagrams of displays 1402A and 1402B on wall-mounted control devices. Displays 1402A and 1402B are shown in FIGS. 14A and 14B when none of the icons are illuminated. Circle 1406B is visible on display 1402B because fewer coats of light colored paint were used on wall-mounted control device 1400B, as compared to wall-mounted control device 1400A. In some examples, wall-mounted control device 1400A includes three or more layers of light colored paint on the interior surface of a film layer of display 1402A, whereas display 1402B may only have one layer of light colored paint. As a result, the opening for the ambient light sensor of wall-mounted control device 1400B may be visible to a user as circle 1406B.

Display 1402A may have a blank user-facing surface when none of the icons are illuminated (e.g., when wall-mounted control device 1400A is powered off). When wall-mounted control device 1400A is powered off, icons may be unilluminated, blank, plain, and/or not visible. In some examples, the blank surface does not include any printing or markings. Alternatively, display 1402A may have a printed brand name, brand icon, model name, or model icon. In some examples, display 1402A may be flat or may include one or more indents or bump-outs to identify buttons for user input. The blank surface of display 1402A may be substantially one color across the entire blank surface. The color of the surface of display 1402A may be a light color such as white, off-white, beige, cream, gray, or silver. The blank user-facing surface may be aesthetically desirable. For example, wall-mounted control device 1400A may have a color that is substantially similar to the walls in a typical house. Thus, wall-mounted control device 1400A may be less conspicuous than other wall-mounted control devices. If paint is used to conceal the opening for an ambient light sensor, the opening can be larger without being visible to the user. A larger opening may improve the effectiveness of the ambient light sensor, as compared to a sensor positioned in a smaller opening.

Hiding the opening for an ambient light sensor may be important because it may be desirable for the opening to face forward, rather than up, down, or to the side. For an opening for an ambient light sensor that points downward, the brightness detected by the ambient light sensor may be based on the color of flooring underneath the wall-mounted control device. For an opening for an ambient light sensor that points upward, the brightness detected by the ambient light sensor may be based on the color of the ceiling and/or the ceiling height. The ambient light sensor should face forward because that direction may provide the most accurate reading of the ambient light. However, pointing the opening forward may affect the aesthetics if only one coat of light colored paint is used.

An ambient light sensor may be configured to detect the brightness of light in a room. However, in some examples, the orientation of the ambient light sensor, the shape of an opening in the light guide, and the direction that the light arrives from. The ambient light that a user experiences may not be based on the position of the light source, so it may be desirable for an ambient light sensor in a wall-mounted control device to detect brightness regardless of the direction from which light is received. The multiple coats of light colored paint on display 1402A may disperse ambient light such that the angle of arrival of the light has little or no effect on the brightness sensed by the ambient light sensor of wall-mounted control device 1400A. The ambient light sensor in wall-mounted control device 1400A may be more immune to the angle of the incoming light, as compared to wall-mounted control device 1400B. Immunity to angle of incoming light may be especially important for stationary wall-mounted control devices that cannot orient the ambient light sensor in various directions. The ambient light sensor in wall-mounted control device 1400A may have a wider field of view, as compared to wall-mounted control device 1400B. Thus, wall-mounted control device 1400A may be better tuned to the ambient brightness in its environment than wall-mounted control device 1400B.

The multiple coats of light colored paint may reduce the brightness of the light received by the ambient light sensor. For example, the light colored paint may reduce the brightness of light received by the ambient light sensor by more than eighty percent, more than ninety percent, or more than ninety-five percent, as compared to the brightness of the ambient light. Processing circuitry of wall-mounted control device 1400A may be configured to determine a brightness at which to illuminate the icons of wall-mounted control device 1400A based on the brightness sensed by the ambient light sensor.

TABLE I example look-up table for determining brightness setting for icons

| ALS Level | Room Lux | Lux with lens |
|---|---|---|
| 1 | <2 | <0.1 |
| 2 | 2 | 0.1-0.25 |
| 3 | 8 | 0.26-0.45 |
| 4 | 10 | 0.46-0.65 |
| 5 | 14 | 0.66-0.9 |
| 6 | 20 | 0.91-1.3 |
| 7 | 30 | 1.31-1.7 |
| 8 | 45 | 1.71-2.0 |
| 9 | 50 | 2.01-2.3 |
| 10 | 80 | 2.31-2.6 |
| 11 | 120 | 2.61-2.9 |
| 12 | 150 | 2.91-3.7 |
| 13 | 175 | 3.71-5 |
| 14 | 190 | 5.01-7.5 |
| 15 | >320 | >7.5 |

Table I shows an example look-up table that could be used by processing circuitry coupled to a circuit board to determine a brightness level for the LEDs coupled to the circuit board. The look-up table may be stored on a memory coupled to the circuit board. Table I is just one example of a look-up table that can be used to control the brightness of the icons on a display. In other examples, there may be more or fewer than fifteen levels for the ambient light sensor, and/or the levels may cover brightness ranges that are different from those shown in Table I.

The processing circuitry may be configured to determine the brightness of the lens shown in the third column of Table I based on a signal from the ambient light sensor. The ambient light sensor may be configured to generate the signal based on the brightness of light in the lens because the film layer and lens attenuate the ambient light rather than letting it straight through to the sensor. An amplitude of the signal and/or a digital value of the signal may represent the brightness of light sensed by the ambient light sensor. The processing circuitry may be configured to determine the brightness sensed by the ambient light sensor only when the wall-mounted control device is in an idle mode where the LEDs are operating at reduced brightness.

The second column of Table I shows the ambient light in the room, which may be ten to thirty times brighter than the brightness sensed by the ambient light sensor. The ambient light sensor receives a small percentage of the ambient light because the light colored paint on the interior surface of the film layer disperses and/or impedes the ambient light. The processing circuitry may be configured to determine one of the fifteen lux ranges based on the signal received from the ambient light sensor. The processing circuitry may be configured to then determine and store the associated level number in the first column.

For example, in response to determining that the signal from the ambient light sensor is associated with a lux of 0.70, the processing circuitry may be configured to determine a level of five. The processing circuitry can determine a brightness level for some or all of the LEDs based on the ambient light sensor level determined using the look-up table. The processing circuitry can also control one or more of the LEDs based on the ambient light sensor level. Not all of the LEDs may have the same brightness level; the processing circuitry may be configured to apply a scaling factor (e.g., seventy or eighty percent) for the brightness of some of the LEDs.

By controlling the brightness of the LEDs based on the sensed ambient light, the processing circuitry may be configured to present a display that is readable while reducing the chance of light bleed in a low-light environment, as compared to another device that does not adjust the brightness based on ambient light. If the brightness of the display is too low in a well-lit room, the user may not be able to read the display. If the brightness of the display is too high in a dark room, light bleed among the LEDs and the ambient light sensor may be visible.

Figure 15:
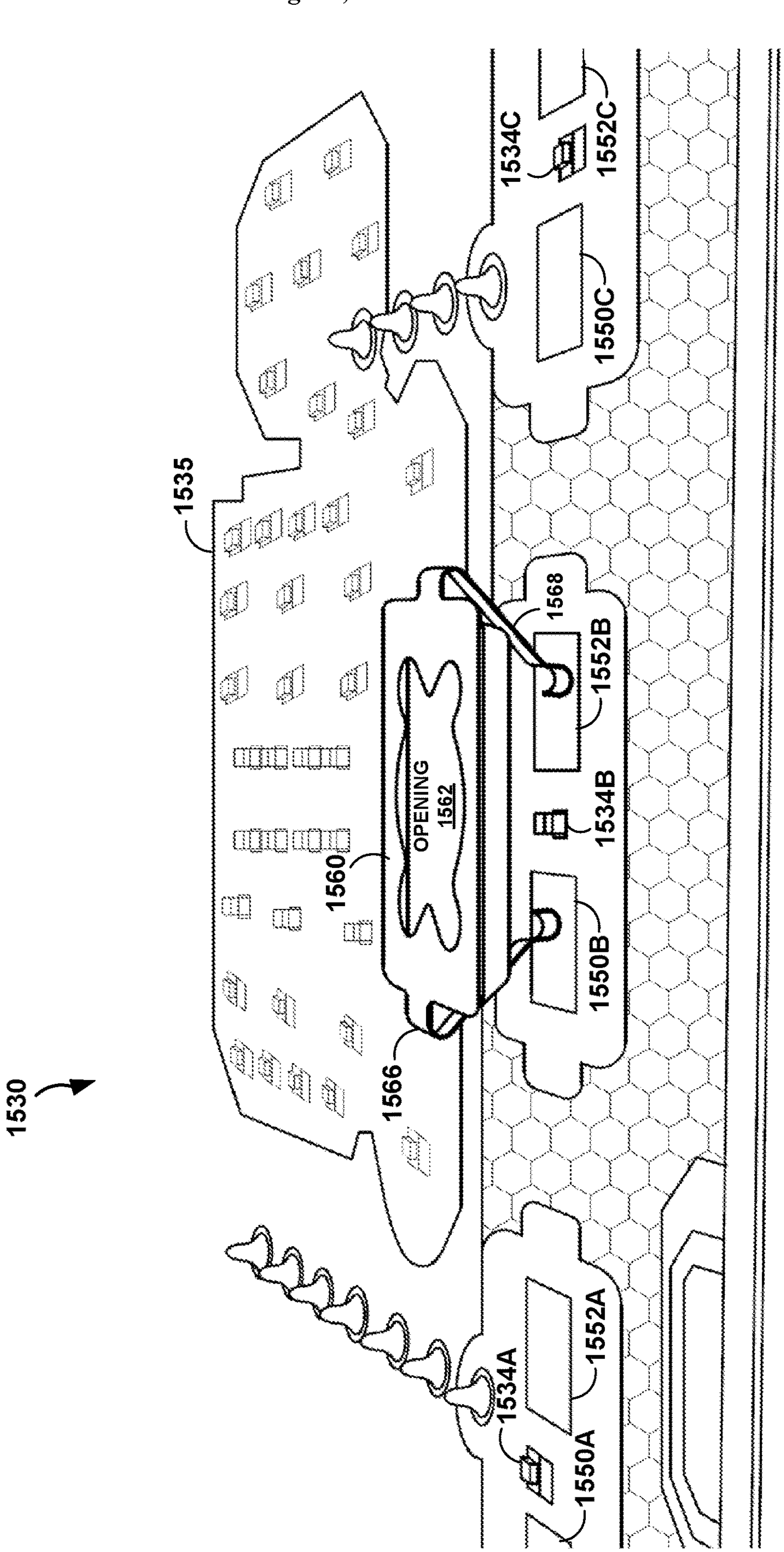
FIG. 15 is a diagram showing a conductive element coupled to circuit board, in accordance with one or more techniques described herein.

FIG. 15 is a diagram showing a conductive element 1560 coupled to circuit board 1530, in accordance with one or more techniques described herein. Circuit board 1530 is shown in the background of FIG. 15 having thirty-eight LEDs attached to circuit board 1530. FIG. 15 shows that each of the larger seven-segment displays has two LEDs per segment (e.g., fourteen LEDs per digit). The area on circuit board 1530 with the thirty-eight LEDs is bounded by printing 1535, which may include light colored printing for promoting the reflections of light off circuit board 1530. The light bouncing off circuit board 1530 to the display may be desirable to increase the brightness of the icons on the display for a given illumination level of the LEDs.

In the example shown in FIG. 15, conductive element 1560 includes two legs 1566 and 1568, where leg 1566 is coupled to pad 1550B on circuit board 1530, and leg 1568 is coupled to pad 1552B on circuit board 1530. In some examples, both of legs 1566 and 1568 may be coupled to a single pad. Conductive element 1560 may function properly even if only one of legs 1566 and 1568 is present or is coupled to pad 1550B or 1552B. Legs 1566 and 1568 may balance and hold the plate of conductive element 1560 off circuit board 1530 so that the plate can press against the display. There may be a gap between the display and circuit board 1530 to allow for the LEDs to illuminate the icons on the display. Conductive element 1560 may act as an extension of the circuit board 1530, allowing the user to form a capacitor that can be sensed by processing circuitry coupled to circuit board 1530. It may be desirable for conductive element 1560 to make good contact with the display (e.g., no air gap) where conductive element 1560 is acting as a capacitive touch electrode. LED 1534B is positioned between pads 1550B and 1552B. The distance between the points where legs 1566 and 1568 are coupled to pads 1550B and 1552B may be less than the width of conductive element 1560 where conductive element 1560 is in contact with the lens of a display.

Conductive element 1560 may also include opening 1562 for allowing light generated by LED 1534B to pass through conductive element 1560 to a lens of a display (not shown in FIG. 15). Opening 1562 is shown in FIG. 15 as having an X-shape with a circle or an oval at the center of the X-shape. Opening 1562 may have an X-shape, a circular shape, an oval shape, rectangular shape, and/or a polygonal shape. Conductive element 1560 and opening 1562 are symmetrical along two dimensions. For example, if conductive element 1560 is rotated such that leg 1566 is coupled to pad 1552B and leg 1568 is coupled to pad 1550B, the shape of opening 1562 relative to LED 1534B will be substantially identical to the shape shown in FIG. 15. Thus, in the example shown in FIG. 15, conductive element 1560 is reversible such that conductive element 1560 will have substantially the same layout if rotated by one hundred and eighty degrees, which can simplify the assembly process.

In examples in which opening 1562 is shaped like the icon on the display, opening 1562 may be large enough to allow light for the icon, but not too large to cause a capacitive dead zone to occur on the display. A capacitive dead zone can occur in examples in which the opening on a conductive element is large enough that the device will not sense when a user touches the center of the icon. The front surface of the display may include a marking or dimple to show the user the center of a button, so the user may be confused if touching the marking is not registered by the device. By using an X-shape for opening 1562, conductive element may form a capacitor with the finger of a user even if the user touches the center of the icon on the display. Thus, the likelihood and size of a capacitive dead zone occurring may be reduced by the design of conductive elements 1560A-1560C.

LEDs 1534A-1534C may be configured to illuminate icons on a display. Even if the icon illuminated by LED 1534A is different from the icon illuminated by LED 1534B, identical conductive elements may be used for each icon. Identical conductive elements can simplify the assembly process and reduce production costs, as compared to have three separately designed conductive elements. For example, FIG. 1 depicts three different icons 130-132 (e.g., chevrons and a circle), but conductive element 1560 may be used for all three icons because the X-shape of opening 1562 can accommodate chevron shapes and circle shapes. Thus, a first conductive element that is identical to conductive element 1560 may be coupled to pads 1550A and 1552A, and a second conductive element that is identical to conductive element 1560 may be coupled to pads 1550C and 1552C.

Conductive element 1560 may be configured to press against the display to create one electrode of a capacitor. When a user touches the display, the user's finger can form the other electrode of the capacitor. The lens and film layer of the display may form the dielectric layer of the capacitor between conductive element 1560 and the finger of the user.

Figure 16A:
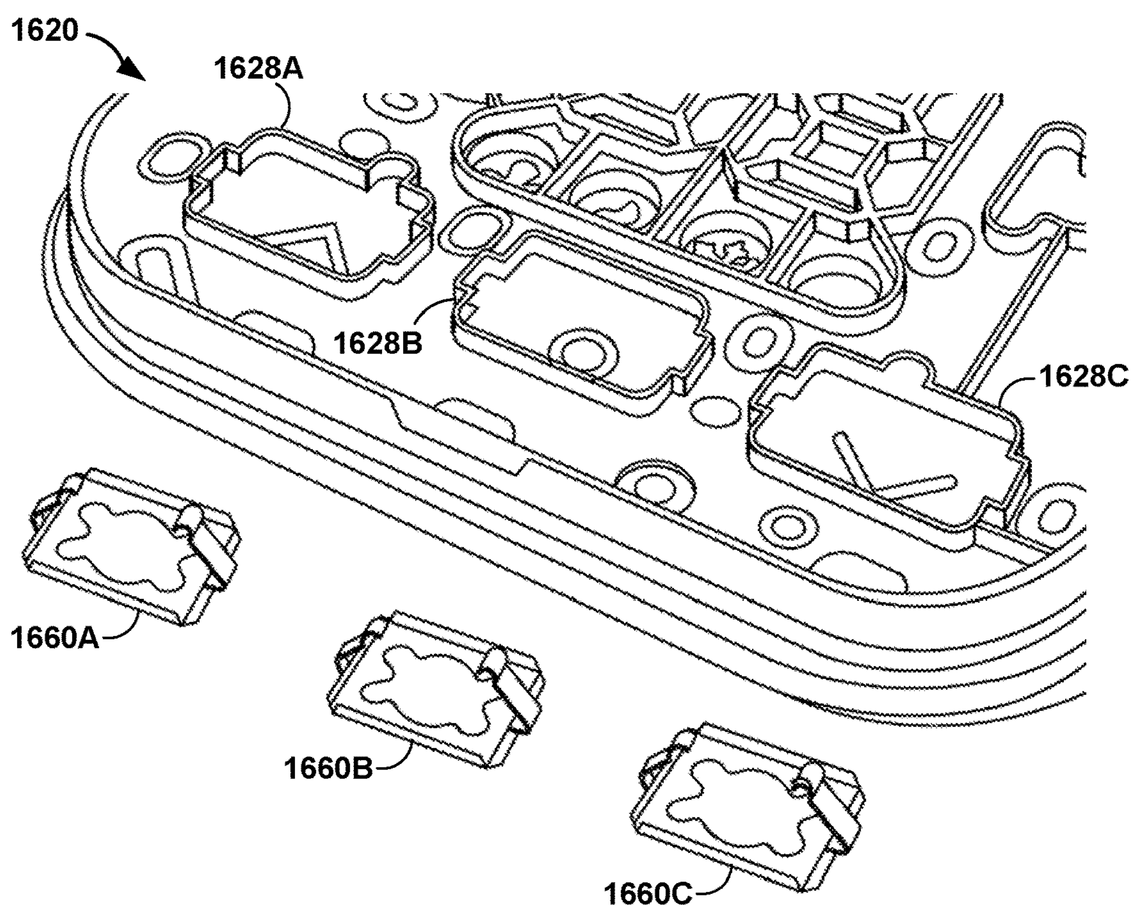
FIGS. 16A and 16B are diagrams showing conductive elements before and after assembly, in accordance with one or more techniques described herein.
Figure 16B:
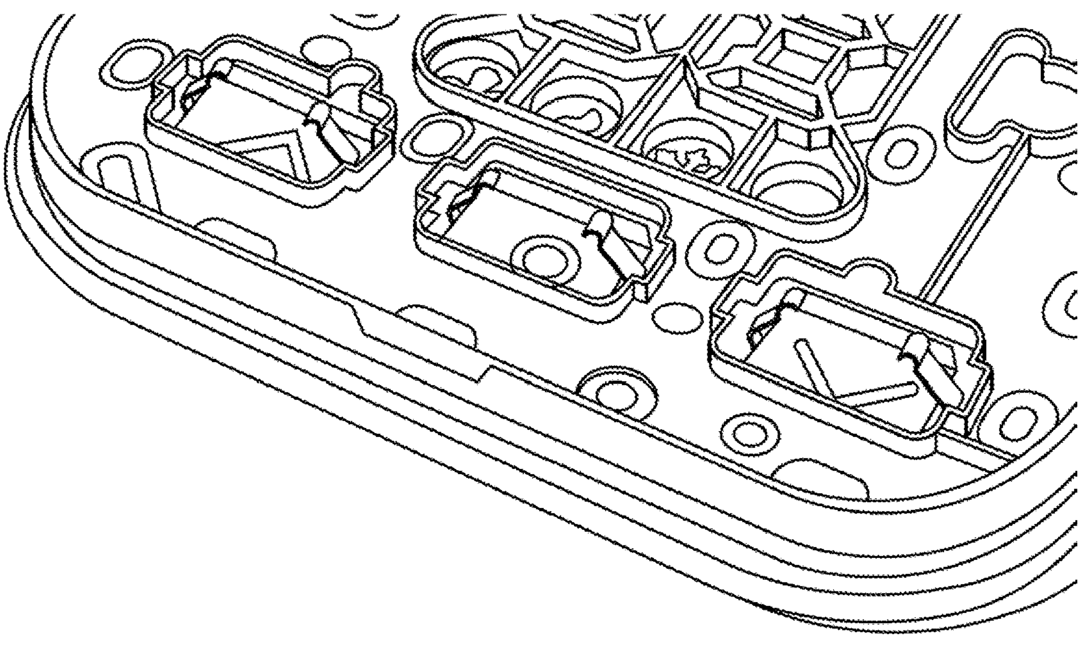

FIGS. 16A and 16B are diagrams showing conductive elements 1660A-1660C before and after assembly, in accordance with one or more techniques described herein. Light guide 1620 may include openings 1628A-1628C that can accommodate conductive elements 1660A-1660C. During the assembly process, each of conductive elements 1660A-1660C may be positioned in openings 1628A-1628C as shown in FIG. 16B.

Light guide 1620 may include barriers around each of openings 1628A-1628C for impeding light from traveling among openings 1628A-1628C. When the wall-mounted control device is assembled, a circuit board may be in contact with light guide 1620 and conductive elements 1660A-1660C. The barrier around opening 1628A may impede light generated by an LED positioned proximate conductive element 1660A from traveling to conductive element 1660B.

Figure 17:
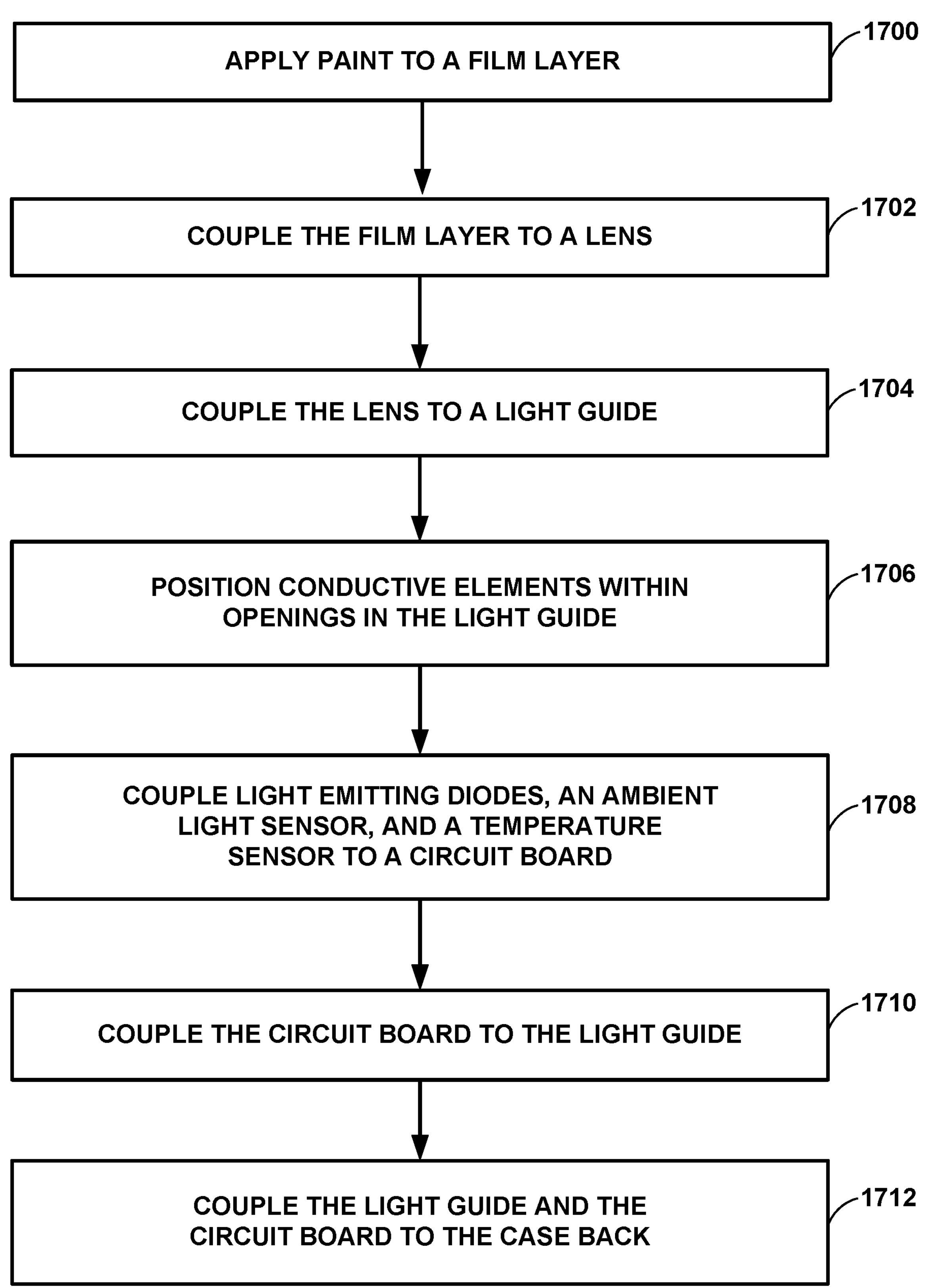
FIG. 17 is a flow diagram illustrating an example operation for assembling a wall-mounted control device.

FIG. 17 is a flow diagram illustrating an example operation for assembling a wall-mounted control device, in accordance with one or more techniques described herein. FIG. 17 is described with respect to the components shown in FIG. 2. However, the techniques of FIG. 17 may be performed with respect to any of the components shown in FIGS. 1, 3-8, 10A-12, and 14A-16B.

In the example of FIG. 17, paint is applied to film layer 204 (1700). Several coats of paint may be applied to interior surface 206B of film layer 204, such as layers 308A-308E shown in FIG. 3. Light colored paint may be applied first to lens, followed by a darker colored coat of paint. The darker colored coat of paint may act as a mask that prevents light from entering film layer 204 from lens 210, except where there are openings in the mask. The openings in the mask layer of paint may be shaped like the icons that will be illuminated on front surface 206A of film layer 204.

In the example of FIG. 17, film layer 204 is coupled to lens 210 (1702), which may be part of an in-mold lamination process or an in-mold decoration process. Lens 210 is then coupled to light guide 220 (1704). Lens 210 may be heat staked to light guide 220, whereby material of lens 210 (e.g., shaped like a post) is inserted into light guide 220 and heated to create an anchor that binds lens 210 to light guide 220. Conductive elements are then positioned in openings in light guide 220 (1706). FIGS. 16A and 16B depict an example of conductive elements 1660A-1660C being positioned in openings 1628A-1628C of light guide 1620.

In the example of FIG. 17, LEDs 234-236, ambient light sensor 232, and temperature sensor 238 are coupled to circuit board 230 (1708). Components 232, 234-236, and 238 may be surface-mounted to pads on circuit board 230 or through-hold coupled to holes on circuit board 230. Although FIG. 17 depicts step 1708 as performed after steps 1700-1706, components 232, 234-236, and 238 may be coupled to circuit board 230 before any or all of steps 1700-1706. Circuit board 230 is then coupled to light guide 220 (1710). Circuit board 230 can be laid into light guide 220 to capture the conductive elements that may be used to create touch buttons. Light guide 220 and circuit board 230 are coupled to case back 240 (1712). For example, circuit board 230 can be laid on barrier 242 in case back 240. Circuit board 230 can be coupled to case back 240 by screws, pins, solder, or any other coupling mechanism.

This disclosure has described functionality of processing circuitry, such as receiving user input, determining the brightness of ambient light, determining temperature and/or humidity, illuminating icons, activating and deactivating LEDs, and adjusting brightness of the icons. In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of random access memory, read-only memory (ROM), electrically erasable programmable ROM, magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Combinations of the above should also be included within the scope of computer-readable media.

Instructions may be executed by one or more processors, such as one or more digital signal processors, general purpose microprocessors, application-specific integrated circuits, field-programmable gate arrays, or other equivalent integrated or discrete logic circuitry. Accordingly, the term "processor" or "processing circuitry," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

The following numbered aspects demonstrate one or more clauses of the disclosure.

Clause 1. A wall-mounted control device includes a circuit board and a temperature sensor coupled to the circuit board. The wall-mounted control device also includes a plurality of LEDs coupled to the circuit board. The wall-mounted control device further includes a case back including a barrier and a vent. When the circuit board is attached to the case back, the barrier prevents air flow between a first region and a ventless region. When the circuit board is attached to the case back, the vent allows air flow from outside of the wall-mounted control device to the first region, the plurality of LEDs is positioned in the first region, and the temperature sensor is positioned in the ventless region.

Clause 2. The wall-mounted control device of the preceding clause, wherein the barrier is a first barrier, and the case back comprises a second barrier separate from the first barrier. When the circuit board is attached to the case back, the second barrier prevents air flow between a first subregion of the ventless region and a second subregion of the ventless region.

Clause 3. The wall-mounted control device of the preceding clause, when the circuit board is attached to the case back, the second subregion is bounded by the second barrier and by an exterior side of the case back, the second subregion is not bounded by the first barrier, and the temperature sensor is positioned in the second subregion.

Clause 4. The wall-mounted control device of the preceding clauses or any combination thereof, wherein the circuit board includes a first portion and a second portion protruding from the first portion, a length of the second portion is at least twice a width of the second portion, and the temperature sensor is coupled to the second portion of the circuit board.

Clause 5. The wall-mounted control device of the preceding clauses or any combination thereof, the vent is a first vent, and the case back further comprises a second vent that allows air flow from outside of the wall-mounted control device to the first region.

Clause 6. The wall-mounted control device of the preceding clause, the case back further comprises a third vent that allows air flow from outside of the wall-mounted control device to the first region.

Clause 7. The wall-mounted control device of clause 5 or clause 6, wherein the first vent is positioned on a first side of the case back, the second vent is positioned on a second side of the case back, and a first normal vector of the first side is at least 120 degrees away from a second normal vector of the second side.

Clause 8. The wall-mounted control device of the preceding clauses or any combination thereof, the barrier is a first barrier, the case back further comprises a third barrier, the wall-mounted control device further comprises a humidity sensor coupled to the circuit board. When the circuit board is attached to the case back, the humidity sensor is positioned in the third region.

Clause 9. The wall-mounted control device of the preceding clause, the third barrier prevents air flow between the first region and a third region and between the ventless region and the third region.

Clause 10. The wall-mounted control device of clause 8 or clause 9, wherein the vent is a first vent, and the wall-mounted control device further comprises a fourth vent. When the circuit board is attached to the case back, the fourth vent allows air flow from outside of the wall-mounted control device to the third region.

Clause 11. The wall-mounted control device of the preceding clauses or any combination thereof, further including a display comprising light colored paint on a film layer.

Clause 12. The wall-mounted control device of the preceding clauses or any combination thereof, further including an ambient light sensor coupled to the circuit board and positioned behind a portion of a film layer of a display.

Clause 13. The wall-mounted control device of the preceding clause, wherein light colored paint on the film layer is configured to impede light from outside of the wall-mounted control device by more than fifty percent as the light passes to the ambient light sensor.

Clause 14. The wall-mounted control device of the preceding clauses or any combination thereof, further including a display including a film layer and a lens, the film layer including an interior surface facing the lens and a front surface opposite the interior surface. The interior surface of the film layer comprises light colored paint and a mask of dark paint, and the mask of dark paint does not cover a point on the interior surface closest to the ambient light sensor.

Clause 15. The wall-mounted control device of the preceding clauses or any combination thereof, further including a display comprising a lens, a first LED coupled to the circuit board and configured to illuminate a first icon on the display; a second LED coupled to the circuit board and configured to illuminate a second icon on the display; and a light guide positioned between the circuit board and the display. The light guide comprises a rib extending into the lens and positioned between the first LED, and the light guide is configured to block at least ninety percent of the light generated by the first LED from traveling to the second LED.

Clause 16. The wall-mounted control device of the preceding clauses or any combination thereof, further including a display comprising a lens, an ambient light sensor coupled to the circuit board and positioned behind a first portion of the display, and a plurality of LEDs coupled to the circuit board, positioned behind a second portion of the display, and configured to illuminate a plurality of icons on the display. The wall-mounted control device also includes a light guide positioned between the circuit board and the display, wherein the light guide comprises a rib extending into the lens and positioned between the ambient light sensor and the plurality of LEDs, and the light guide is configured to block at least ninety percent of the light generated by the plurality of LEDs from traveling to the ambient light sensor.

Clause 17. A wall-mounted control device includes a circuit board including a first portion and a second portion protruding from the first portion, where a length of the second portion is at least twice a width of the second portion. The wall-mounted control device also includes a temperature sensor coupled to the second portion of the circuit board, and a plurality of LEDs coupled to the circuit board. The wall-mounted control device further includes a case back including a first vent on a first side of an exterior of the case back, a barrier in an interior of the case back, and a second vent on a second side of an exterior of the case back, where a first normal vector of the first side is at least 120 degrees away from a second normal vector of the second side. When the circuit board is attached to the case back, the barrier prevents air flow between a first region and a ventless region, the first vent allows air flow from outside of the wall-mounted control device to the first region, the second vent allows air flow from outside of the wall-mounted control device to the first region, the plurality of LEDs is positioned in the first region, and the temperature sensor is positioned in the ventless region.

Clause 18. The wall-mounted control device of clause 17, further including the elements of clauses 1-16 or any combination thereof.

Clause 19. The wall-mounted control device of clause 17 or clause 18, wherein the barrier is a first barrier, and the case back comprises a second barrier separate from the first barrier. When the circuit board is attached to the case back, the second barrier prevents air flow between a first subregion of the ventless region and a second subregion of the ventless region, and the second subregion is bounded by the second barrier and by an exterior of the case back, and wherein the second subregion is not bounded by the first barrier.

Clause 20. The wall-mounted control device of clauses 17-19 or any combination thereof, wherein the case back further comprises a third vent that allows air flow from outside of the wall-mounted control device to the first region.

Clause 21. The wall-mounted control device of clauses 17-20 or any combination thereof, wherein the barrier is a first barrier, the case back further comprises a third barrier, and the wall-mounted control device further comprises a humidity sensor coupled to the circuit board. When the circuit board is attached to the case back, the third barrier prevents air flow between the first region and a third region and between the ventless region and the third region, and the humidity sensor is positioned in the third region.

Clause 22. The wall-mounted control device of clauses 17-21 or any combination thereof, wherein the wall-mounted control device further comprises a fourth vent. When the circuit board is attached to the case back, the fourth vent allows air flow from outside of the wall-mounted control device to the third region.

Clause 23. A wall-mounted control device includes a circuit board, a temperature sensor coupled to the circuit board, a humidity sensor coupled to the circuit board, a plurality of LEDs coupled to the circuit board, and a case back including one or more interior barriers, a first vent, and a second vent. When the circuit board is attached to the case back, the one or more interior barriers prevent air flow between a first vented region and a first ventless region, between a second vented region and the first ventless region, and between the first ventless region and a second ventless region, where the first ventless region is adjacent to the first vented region, the second vented region, and the second ventless region. When the circuit board is attached to the case back, the first vent allows air flow from outside of the wall-mounted control device to the first vented region, the second vent allows air flow from outside of the wall-mounted control device to the second vented region, the plurality of LEDs is positioned in the first vented region, the temperature sensor is positioned in the second ventless region, and the humidity sensor is positioned in the second vented region.

Clause 24. The wall-mounted control device of clause 23, further including the elements of clauses 1-22 or any combination thereof.

Clause 25. The wall-mounted control device of clause 23 or clause 24, where the case back further comprises a third vent that allows air flow from outside of the wall-mounted control device to the first vented region.

Clause 26. A wall-mounted control device includes a display, a circuit board, and a plurality of LEDs coupled to the circuit board and configured to illuminate a plurality of icons on the display. The wall-mounted control device also includes a light guide positioned between the circuit board and the display, where the light guide is configured to block at least ninety percent of the light generated by a first LED of the plurality of LEDs from traveling to a second LED of the plurality of LEDs.

Clause 27. The wall-mounted control device of clause 26, further including the elements of clauses 1-25 or any combination thereof.

Clause 28. The wall-mounted control device of clause 26 or clause 27, wherein the light guide is at least partially positioned in an air gap between the circuit board and the display.

Clause 29. The wall-mounted control device of clauses 26-28 or any combination thereof, wherein the display includes a film layer and a lens, the lens is in contact with the film layer and in contact with the light guide, and the light guide extends from the circuit board to within one millimeter or less from the film layer.

Clause 30. The wall-mounted control device of clauses 26-29 or any combination thereof, wherein a user-facing side of the display comprises a blank surface when the wall-mounted control device is powered off.

Clause 31. The wall-mounted control device of clauses 26-30 or any combination thereof, wherein the display comprises a lens, and the light guide includes a plurality of ribs protruding into the lens.

Clause 32. The wall-mounted control device of clause 31, wherein the lens comprises an in-mold lamination lens.

Clause 33. The wall-mounted control device of clause 31 or clause 32, wherein a first thickness of the lens is greater than 1.5 millimeters where none of the plurality of ribs protrudes into the lens, and a second thickness of the lens is less than one millimeter where a first rib of the plurality of ribs protrudes into the lens.

Clause 34. The wall-mounted control device of clauses 26-33 or any combination thereof, wherein the display comprises a film layer, and the light guide is not in contact with the film layer.

Clause 35. The wall-mounted control device of clauses 26-34 or any combination thereof, wherein seven LEDs of the plurality of LEDs are configured to form a seven-segment display, and the light guide is configured to block at least ninety percent of the generated by one of the seven LEDs from traveling to any other LED of the seven LEDs.

Clause 36. The wall-mounted control device of clauses 26-35 or any combination thereof, further comprising an ambient light sensor coupled to the circuit board, wherein the light guide is configured to block at least ninety percent of the light generated by each LED of the plurality of LEDs from traveling to the ambient light sensor.

Clause 37. The wall-mounted control device of clause 36, wherein the display includes a lens, the light guide includes a rib protruding into the lens, and the rib is positioned between the plurality of LEDs and the ambient light sensor.

Clause 38. The wall-mounted control device of clause 37, wherein the rib comprises a C-shaped rib positioned between the ambient light sensor and the plurality of LEDs.

Clause 39. The wall-mounted control device of clause 37 or clause 38, wherein the rib comprises an L-shaped rib positioned between the ambient light sensor and the plurality of LEDs.

Clause 40. The wall-mounted control device of clauses 26-39 or any combination thereof, further comprising an ambient light sensor coupled to the circuit board, wherein the display comprising light colored paint on a film layer, and the light colored paint on the film layer is configured to impede light from outside of the wall-mounted control device by more than fifty percent as the light passes to the ambient light sensor.

Clause 41. A wall-mounted control device includes a circuit board, a plurality of LEDs coupled to a first surface of the circuit board, and a light guide in contact with the first surface of the circuit board. The wall-mounted control device also includes a display including a lens in contact with the light guide and a film layer in contact with the lens, where the light guide includes a plurality of ribs extending into the lens. The plurality of LEDs is configured to illuminate a plurality of icons on the film layer of the display, and the light guide is configured to block at least ninety percent of the light generated by a first respective LED of the plurality of LEDs from traveling to a second respective LED of the plurality of LEDs.

Clause 42. The wall-mounted control device of clause 41, further including the elements of clauses 1-40 or any combination thereof.

Clause 43. The wall-mounted control device of clause 41 or clause 42, wherein the light guide extends from the circuit board to the lens through an air gap between the circuit board and the lens.

Clause 44. The wall-mounted control device of clauses 41-43 or any combination thereof, wherein the lens comprises an in-mold lamination lens.

Clause 45. The wall-mounted control device of clauses 41-44 or any combination thereof, wherein a nominal thickness of the lens is greater than 1.5 millimeters, and a second thickness of the lens is less than one millimeter where a first rib of the plurality of ribs extends into the lens.

Clause 46. The wall-mounted control device of clauses 41-45 or any combination thereof, wherein none of the plurality of ribs is not in contact with the film layer of the display.

Clause 47. A wall-mounted control device includes a circuit board, a display including a lens and a film layer, a first LED coupled to the circuit board and configured to illuminate a first icon on the display, a second LED coupled to the circuit board and configured to illuminate a second icon on the display, an ambient light sensor coupled to the circuit board, and a light guide positioned between and in contact with the circuit board and the lens. The light guide includes a first rib extending into the lens between the first LED and the second LED, the light guide includes a second rib extending into the lens between the first LED and the ambient light sensor, the light guide is configured to block at least ninety percent of the light generated by the first LED from traveling to the second LED, and the light guide is configured to block at least ninety percent of the light generated by the first LED from traveling to the ambient light sensor.

Clause 48. The wall-mounted control device of clause 47, further including the elements of clauses 1-46 or any combination thereof.

Clause 49. The wall-mounted control device of clause 47 and clause 48, wherein an interior surface of the film layer is in contact with the lens, the display comprises light colored paint on the interior surface of the film layer, and the light colored paint is configured to impede light from outside of the wall-mounted control device by more than fifty percent as the light passes to the ambient light sensor.

Clause 50. A wall-mounted control device includes a display including light colored paint on a film layer. The wall-mounted control device also includes an ambient light sensor positioned behind a portion of the film layer. The light colored paint on the film layer is configured to impede light from outside of the wall-mounted control device by more than fifty percent as the light passes to the ambient light sensor.

Clause 51. The wall-mounted control device of clause 50, further including the elements of clauses 1-49 or any combination thereof.

Clause 52. The wall-mounted control device of clause 50 or clause 51, wherein the display further comprises a mask of dark paint on the film layer, and the mask of dark paint does not cover the portion of the film layer positioned ahead of the ambient light sensor.

Clause 53. The wall-mounted control device of clause 52, wherein the display further comprises a lens, and the film layer comprises an interior surface facing the lens and a front surface opposite the interior surface. The interior surface of the film layer comprises the light colored paint and the mask of dark paint, and the mask of dark paint does not cover a point on the interior surface closest to the ambient light sensor.

Clause 54. The wall-mounted control device of clauses 50-53 or any combination thereof, wherein the light colored paint on the film layer is configured to disperse the light from outside of the wall-mounted control device by spreading out the light across the light colored paint on the film layer.

Clause 55. The wall-mounted control device of clauses 50-54 or any combination thereof, wherein the display is configured to deliver a second amount of light to the ambient light sensor in response to receiving a first amount of light from a first angle. The display is also configured to deliver substantially the second amount of light to the ambient light sensor in response to receiving the first amount of light from a second angle, wherein the second angle is at least forty degrees different from the first angle.

Clause 56. The wall-mounted control device of clauses 50-55 or any combination thereof, further comprising a circuit board and a light guide, wherein the ambient light sensor is coupled to the circuit board, and the light guide is positioned between the display and the circuit board. The ambient light sensor is positioned in an opening in the light guide behind the display, and a first diameter of the opening at a first interface of the light guide and the display is greater than five millimeters.

Clause 57. The wall-mounted control device of clause 56, wherein the light guide has a conical shape around the ambient light sensor, and the first diameter of the opening at the first interface of the light guide and the display is greater than a second diameter of the opening at a second interface of the light guide and the circuit board.

Clause 58. The wall-mounted control device of clauses 50-57 or any combination thereof, further comprising processing circuitry configured to receive a signal from the ambient light sensor, wherein the signal depends on a first brightness of the light sensed by the ambient light sensor. The processing circuitry is also configured to set a second brightness of the display by at least determining the second brightness of the display based on a look-up table and a magnitude of the signal.

Clause 59. The wall-mounted control device of clauses 50-58 or any combination thereof, wherein the light colored paint on the film layer is configured to impede the light from outside of the wall-mounted control device by more than eighty percent as the light passes to the ambient light sensor.

Clause 60. The wall-mounted control device of clauses 50-59 or any combination thereof, further comprising a light emitting diode (LED) positioned behind the display and configured to illuminate an icon on the display. The wall-mounted control device also includes a light guide positioned behind the display between the ambient light sensor and the LED, wherein the light guide is configured to block at least ninety percent of the light generated by the LED from traveling to the ambient light sensor.

Clause 61. The wall-mounted control device of clause 60, further comprising a circuit board positioned behind the display and arranged parallel to the display, wherein the LED is coupled to the circuit board, and the light guide is positioned between the circuit board and the display.

Clause 62. The wall-mounted control device of clauses 61, wherein the light guide extends from the circuit board to within one millimeter or less from the film layer.

Clause 63. A wall-mounted control device includes a circuit board, an LED coupled to the circuit board, an ambient light sensor coupled to the circuit board, and a light guide in contact with the circuit board. The wall-mounted control device also includes a display including a lens in contact with the light guide and a film layer in contact with the lens. The light guide includes a rib extending into the lens, where the rib is positioned between the LED and the ambient light sensor, the plurality of LEDs is configured to illuminate an icon on the film layer of the display, and the film layer is configured to impede light from outside of the wall-mounted control device by more than fifty percent as the light passes through an opening in the light guide to the ambient light sensor.

Clause 64. The wall-mounted control device of clause 63, further including the elements of clauses 1-62 or any combination thereof.

Clause 65. The wall-mounted control device of clause 63 or clause 64, wherein the display comprises light colored paint on an interior surface of the film layer, and the light colored paint on the film layer is configured to impede the light from outside of the wall-mounted control device by more than eighty percent as the light passes to the ambient light sensor.

Clause 66. The wall-mounted control device of clause 65, wherein the light colored paint on the film layer is configured to disperse the light from outside of the wall-mounted control device by spreading out the light across the light colored paint on the film layer, the interior surface of the film layer comprises the light colored paint and the mask of dark paint, and the mask of dark paint does not cover a point on the interior surface closest to the ambient light sensor.

Clause 67. The wall-mounted control device of clauses 63-66 or any combination thereof, further comprising processing circuitry coupled to the circuit board and configured to receive a signal from the ambient light sensor, wherein the signal depends on a first brightness of the light sensed by the ambient light sensor. The processing circuitry is also configured to set a second brightness of the display by at least determining the second brightness of the display based on a look-up table and a magnitude of the signal.

Clause 68. The wall-mounted control device of clauses 63-67 or any combination thereof, wherein the light guide is configured to block at least ninety percent of the light generated by the LED from traveling to the ambient light sensor.

Clause 69. The wall-mounted control device of clauses 63-68 or any combination thereof, wherein the ambient light sensor is positioned in an opening in the light guide behind the display, and a first diameter of the opening at a first interface of the light guide and the display is greater than five millimeters. The light guide has a conical shape around the ambient light sensor, wherein the first diameter of the opening at the first interface of the light guide and the display is greater than a second diameter of the opening at a second interface of the light guide and the circuit board.

Clause 70. A wall-mounted control device includes a circuit board, an ambient light sensor coupled to the circuit board, and a display including light colored paint on an interior surface of a film layer. The wall-mounted control device also includes processing circuitry coupled to the circuit board and configured to receive a signal from the ambient light sensor, where the signal depends on a first brightness of the light sensed by the ambient light sensor. The processing circuitry is also configured to set a second brightness of the display by at least determining the second brightness of the display based on a look-up table and a magnitude of the signal.

Clause 71. The wall-mounted control device of clause 70, further including the elements of clauses 1-69 or any combination thereof.

Clause 72. A wall-mounted control device includes a display including a lens and a film layer, a circuit board positioned behind the display, and an ambient light sensor coupled to the circuit board. The wall-mounted control device also includes a plurality of LEDs coupled to the circuit board and configured to illuminate a plurality of icons on the display. The wall-mounted control device further includes a light guide positioned between the circuit board and the lens, where the light guide is configured to block at least ninety percent of the light generated by the plurality of LEDs from traveling to the ambient light sensor.

Clause 73. The wall-mounted control device of clause 72, further including the elements of clauses 1-71 or any combination thereof.

Clause 74. The wall-mounted control device of clause 72 or clause 73, wherein the light guide is at least partially positioned in an air gap between the circuit board and the lens, and the light guide is in contact with the circuit board and the lens.

Clause 75. The wall-mounted control device of clause 74, wherein the light guide includes a rib positioned between the ambient light sensor and the plurality of LEDs, and the rib extends from the circuit board to within one millimeter or less from the film layer.

Clause 76. The wall-mounted control device of clause 75, wherein a nominal thickness of the lens is greater than 1.5 millimeters, and a second thickness of the lens is less than one millimeter where the rib protrudes into the lens.

Clause 77. The wall-mounted control device of clauses 72-76 or any combination thereof, wherein a user-facing side of the display comprises a blank surface when the wall-mounted control device is powered off.

Clause 78. The wall-mounted control device of clauses 72-77 or any combination thereof, wherein the lens comprises an in-mold lamination lens.

Clause 79. The wall-mounted control device of clauses 72-78 or any combination thereof, wherein the light guide comprises a C-shaped rib protruding into the lens between the ambient light sensor and the plurality of LEDs.

Clause 80. The wall-mounted control device of clauses 72-79 or any combination thereof, wherein the light guide comprises an L-shaped rib protruding into the lens between the ambient light sensor and the plurality of LEDs.

Clause 81. The wall-mounted control device of clauses 72-80 or any combination thereof, wherein the light guide comprises a rib protruding into the lens between the ambient light sensor and the plurality of LEDs, a width of the rib is less than two millimeters, and a length of the rib is in a range between one and five centimeters.

Clause 82. The wall-mounted control device of clauses 72-81 or any combination thereof, wherein the light guide is not in contact with the film layer.

Clause 83. The wall-mounted control device of clauses 72-82 or any combination thereof, wherein the ambient light sensor is positioned in an opening in the light guide behind the lens, and a first diameter of the opening at a first interface of the light guide and the lens is greater than five millimeters.

Clause 84. The wall-mounted control device of clause 83, wherein the light guide has a conical shape around the ambient light sensor, and the first diameter of the opening at the first interface of the light guide and the lens is greater than a second diameter of the opening at a second interface of the light guide and the circuit board.

Clause 85. A wall-mounted control device includes a circuit board, a plurality of LEDs coupled to a first surface of the circuit board, an ambient light sensor coupled to the first surface of the circuit board, and a light guide in contact with the first surface of the circuit board. The wall-mounted control device also includes a display including a lens in contact with the light guide and a film layer including a first coat of light colored paint and a second coat of dark colored paint on an interior surface of the film layer. The light guide includes a rib that extends into the lens, the interior surface of the film layer is in contact with the lens, and the plurality of LEDs is configured to illuminate a plurality of icons on the film layer of the display. The rib is positioned between the ambient light sensor and the plurality of LEDs, and the rib is configured to block at least ninety percent of the light generated by the plurality of LEDs from traveling to the ambient light sensor.

Clause 86. The wall-mounted control device of clause 85, further including the elements of clauses 1-84 or any combination thereof.

Clause 87. The wall-mounted control device of clause 85 or clause 86, wherein the light guide extends from the circuit board to the lens through an air gap between the circuit board and the lens.

Clause 88. The wall-mounted control device of clause 85-87 or any combination thereof, wherein a nominal thickness of the lens is greater than 1.5 millimeters, and a second thickness of the lens is less than one millimeter where the rib extends into the lens.

Clause 89. The wall-mounted control device of clause 85-88 or any combination thereof, wherein the rib is not in contact with the film layer of the display.

Clause 90. The wall-mounted control device of clause 85-89 or any combination thereof, wherein the second coat of dark colored paint does not cover a portion of the interior surface of the film layer closest to the ambient light sensor.

Clause 91. The wall-mounted control device of clause 85-90 or any combination thereof, wherein a user-facing side of the display comprises a blank surface when the wall-mounted control device is powered off.

Clause 92. The wall-mounted control device of clause 85-91 or any combination thereof, wherein the light guide comprises a C-shaped rib protruding into the lens between the ambient light sensor and the plurality of LEDs or an L-shaped rib protruding into the lens between the ambient light sensor and the plurality of LEDs.

Clause 93. A wall-mounted control device includes a circuit board, a plurality of LEDs coupled to the circuit board, an ambient light sensor coupled to the circuit board, a display including a lens, and a light guide positioned between the circuit board and the lens. The ambient light sensor is positioned in an opening in the light guide, a first diameter of the opening at a first interface of the light guide and the lens is greater than five millimeters, and a second diameter of the opening at a second interface of the light guide and the circuit board is greater than three millimeters. The light guide includes a rib extending into the lens and positioned between the ambient light sensor and the plurality of LEDs, the plurality of LEDs is configured to illuminate a plurality of icons on the display, and the rib is configured to block at least ninety percent of the light generated by the plurality of LEDs from traveling to the ambient light sensor.

Clause 94. The wall-mounted control device of clause 93, further including the elements of clauses 1-92 or any combination thereof.

Clause 95. A wall-mounted control device includes a display, a circuit board positioned behind the display, an LED coupled to the circuit board and configured to illuminate an icon on the display. The wall-mounted control device also includes a conductive element coupled to the circuit board and in contact with the display, where the conductive element includes an opening shaped like the icon, and the conductive element is configured to allow light generated by the LED to pass through the opening to the display.

Clause 96. The wall-mounted control device of clause 95, further including the elements of clauses 1-94 or any combination thereof.

Clause 97. The wall-mounted control device of clause 95 or clause 96, wherein the conductive element is a first conductive element, and the wall-mounted control device further comprising a second LED coupled to the circuit board and configured to illuminate a second icon on the display. The wall-mounted control device also includes a second conductive element coupled to the circuit board and in contact with the display, wherein a first shape of the second conductive element is identical to a second shape of the first conductive element.

Clause 98. The wall-mounted control device of clauses 95-97 or any combination thereof, wherein the opening of the conductive element includes an X-shaped opening.

Clause 99. The wall-mounted control device of clauses 95-98 or any combination thereof, wherein the conductive element is coupled to the circuit board at two points, and wherein the LED is coupled to the circuit board at a location between the two points.

Clause 100. The wall-mounted control device of clauses 95-99 or any combination thereof, wherein the conductive element is symmetrical along two orthogonal dimensions such that the conductive element would not substantially change shape if rotated by one hundred and eighty degrees.

Clause 101. The wall-mounted control device of clauses 95-100 or any combination thereof, wherein a user-facing side of the display comprises a blank surface when the wall-mounted control device is powered off.

Clause 102. The wall-mounted control device of clauses 95-101 or any combination thereof, wherein a first portion of the conductive element is in contact with the circuit board, a second portion of the conductive element is in contact with the display, and a first width of the first portion of the conductive element is less than a second width of the second portion of the conductive element.

Clause 103. The wall-mounted control device of clauses 95-102 or any combination thereof, wherein the circuit board comprises a first conductive pad and a second conductive pad, and the conductive element includes a first leg in contact with the first conductive pad and a second leg in contact with the second conductive pad.

Clause 104. The wall-mounted control device of clauses 95-103 or any combination thereof, further comprising a light guide positioned between the display and the circuit board, wherein the light guide comprises a second opening, and the conductive element is positioned within the second opening.

Clause 105. The wall-mounted control device of clause 104, wherein the LED is a first LED, the icon is a first icon, the conductive element is a second conductive element, and the wall-mounted control device further comprises a second LED coupled to the circuit board and configured to illuminate a second icon on the display. The light guide is configured to block at least ninety percent of the light generated by the first LED from traveling to the second LED.

Clause 106. The wall-mounted control device of clause 105, wherein the display comprises a lens in contact with the light guide, and the light guide comprises a rib extending into the lens between the first LED and the second LED.

Clause 107. The wall-mounted control device of clause 106, wherein a first thickness of the lens is greater than 1.5 millimeters where the rib does not protrude into the lens, and a second thickness of the lens is less than one millimeter where the rib protrudes into the lens.

Clause 108. The wall-mounted control device of clauses 95-107 or any combination thereof, further comprising a temperature sensor coupled to the circuit board, and a case back including a barrier and a vent. When the circuit board is attached to the case back, the barrier prevents air flow between a vented region and a ventless region, the vent allows air flow from outside of the wall-mounted control device to the vented region, the plurality of LEDs is positioned in the vented region, and the temperature sensor is positioned in the ventless region.

Clause 109. The wall-mounted control device of clause 108, wherein the barrier is a first barrier, and the case back comprises a second barrier separate from the first barrier. When the circuit board is attached to the case back, the second barrier prevents air flow between a first subregion of the ventless region and a second subregion of the ventless region. When the circuit board is attached to the case back, the second subregion is bounded by the second barrier and by an exterior side of the case back, the second subregion is not bounded by the first barrier, and the temperature sensor is positioned in the second subregion.

Clause 110. The wall-mounted control device of clause 108 or clause 109, wherein the circuit board includes a first portion and a second portion protruding from the first portion, a length of the second portion is at least twice a width of the second portion, and the temperature sensor is coupled to the second portion of the circuit board.

Clause 111. A wall-mounted control device includes a circuit board, a display including a lens, a light guide positioned between the circuit board and the lens, a first conductive element coupled to the circuit board, extending through a first opening in the light guide, and in contact with the lens. The wall-mounted control device also includes a second conductive element coupled to the circuit board, extending through a second opening in the light guide, and in contact with the lens, a first LED coupled to the circuit board and positioned in the first opening in the light guide, and a second LED coupled to the circuit board and positioned in the second opening in the light guide. The light guide includes a rib that extends into the lens, the first LED is configured to illuminate a first icon on the display, the second LED is configured to illuminate a second icon on the display, and a first shape of the second conductive element is identical to a second shape of the first conductive element. The first conductive element is configured to allow light generated by the first LED to pass through the first opening in the light guide and through a third opening in the first conductive element to the display, and the light guide is configured to block at least ninety percent of the light generated by the first LED from traveling to the second LED.

Clause 112. The wall-mounted control device of clause 111, further including the elements of clauses 1-110 or any combination thereof.

Clause 113. The wall-mounted control device of clause 111 or clause 112, wherein the third opening of the first conductive element includes an X-shaped opening.

Clause 114. The wall-mounted control device of clause 111-113 or any combination thereof, wherein the first conductive element is symmetrical along two orthogonal dimensions.

Clause 115. The wall-mounted control device of clause 111-114 or any combination thereof, wherein a user-facing side of the display comprises a blank surface when the wall-mounted control device is powered off.

Clause 116. A wall-mounted control device includes a display including a lens, a circuit board positioned behind the display, a light guide positioned between the circuit board and the lens, an LED coupled to the circuit board, configured to illuminate an icon on the display, and a case back including a barrier, and a vent. The wall-mounted control device also includes a temperature sensor coupled to the circuit board and positioned in a ventless region, a humidity sensor coupled to the circuit board and positioned in a vented region, and a conductive element coupled to the circuit board, extending through a first opening in the light guide, and in contact with the display. The LED is configured to illuminate an icon on the display, the conductive element is configured to allow light generated by the LED to pass through a second opening in the conductive element to the display. The barrier prevents air flow between the vented region and the ventless region, the vent allows air flow from outside of the wall-mounted control device to the vented region, and the LED is positioned outside of the ventless region.

Clause 117. The wall-mounted control device of clause 116, further including the elements of clauses 1-115 or any combination thereof.

Various examples have been described. These and other examples are within the scope of the following claims.

What is claimed is:

1. A wall-mounted control device comprising:
a display;
wherein the display comprises light colored paint on a film layer;
a circuit board;
a plurality of light emitting diodes (LEDs) coupled to the circuit board and configured to illuminate a plurality of icons on the display;
a light guide positioned between the circuit board and the display,
wherein the light guide is configured to block at least ninety percent of the light generated by a first LED of the plurality of LEDs from traveling to a second LED of the plurality of LEDs; and
an ambient light sensor coupled to the circuit board,
wherein the light colored paint on the film layer is configured to impede light from outside of the wall-mounted control device by more than fifty percent as the light passes to the ambient light sensor.

2. The wall-mounted control device of claim 1, wherein the light guide is at least partially positioned in an air gap between the circuit board and the display.

3. The wall-mounted control device of claim 1,
wherein the display includes a film layer and a lens,
wherein the lens is in contact with the film layer and in contact with the light guide, and
wherein the light guide extends from the circuit board to within one millimeter or less from the film layer.

4. The wall-mounted control device of claim 1, wherein a user-facing side of the display comprises a blank surface when the wall-mounted control device is powered off.

5. The wall-mounted control device of claim 1,
wherein the display comprises a lens, and
wherein the light guide includes a plurality of ribs protruding into the lens.

6. The wall-mounted control device of claim 5, wherein the lens comprises an in-mold lamination lens.

7. The wall-mounted control device of claim 5,
wherein a first thickness of the lens is greater than 1.5 millimeters where none of the plurality of ribs protrudes into the lens, and
wherein a second thickness of the lens is less than one millimeter where a first rib of the plurality of ribs protrudes into the lens.

8. The wall-mounted control device of claim 1,
wherein the display comprises a film layer, and
wherein the light guide is not in contact with the film layer.

9. The wall-mounted control device of claim 1,
wherein seven LEDs of the plurality of LEDs are configured to form a seven-segment display, and
wherein the light guide is configured to block at least ninety percent of the light generated by one of the seven LEDs from traveling to any other LED of the seven LEDs.

10. The wall-mounted control device of claim 1, further comprising an ambient light sensor coupled to the circuit board,
wherein the light guide is configured to block at least ninety percent of the light generated by each LED of the plurality of LEDs from traveling to the ambient light sensor.

11. The wall-mounted control device of claim 10,
wherein the display includes a lens,
wherein the light guide includes a rib protruding into the lens, and
wherein the rib is positioned between the plurality of LEDs and the ambient light sensor.

12. The wall-mounted control device of claim 11, wherein the rib comprises a C-shaped rib or an L-shaped rib positioned between the ambient light sensor and the plurality of LEDs.

13. A wall-mounted control device comprising:
a circuit board;
a plurality of light emitting diodes (LEDs) coupled to a first surface of the circuit board;
a light guide in contact with the first surface of the circuit board; and
a display comprising:
a lens in contact with the light guide, wherein the light guide comprises a plurality of ribs extending into the lens; and
a film layer in contact with the lens,
wherein the plurality of LEDs is configured to illuminate a plurality of icons on the film layer of the display, and
wherein the light guide is configured to block at least ninety percent of the light generated by a first respective LED of the plurality of LEDs from traveling to a second respective LED of the plurality of LEDs,
wherein a nominal thickness of the lens is greater than 1.5 millimeters, and
wherein a second thickness of the lens is less than one millimeter where a first rib of the plurality of ribs extends into the lens.

14. The wall-mounted control device of claim 13, wherein the light guide extends from the circuit board to the lens through an air gap between the circuit board and the lens.

15. The wall-mounted control device of claim 13, wherein the lens comprises an in-mold lamination lens.

16. The wall-mounted control device of claim 13, wherein none of the plurality of ribs is not in contact with the film layer of the display.

17. A wall-mounted control device comprising:
a circuit board;
a display including a lens and a film layer;
a first light emitting diode (LED) coupled to the circuit board and configured to illuminate a first icon on the display;
a second LED coupled to the circuit board and configured to illuminate a second icon on the display;
an ambient light sensor coupled to the circuit board; and
a light guide positioned between and in contact with the circuit board and the lens, wherein the light guide comprises a first rib extending into the lens between the first LED and the second LED,
wherein the light guide comprises a second rib extending into the lens between the first LED and the ambient light sensor,
wherein the light guide is configured to block at least ninety percent of the light generated by the first LED from traveling to the second LED, and
wherein the light guide is configured to block at least ninety percent of the light generated by the first LED from traveling to the ambient light sensor,
wherein the display comprises light colored paint on an interior surface of the film layer,
wherein the light colored paint is configured to impede light from outside of the wall-mounted control device by more than fifty percent as the light passes to the ambient light sensor.

18. The wall-mounted control device of claim 17,
wherein the interior surface of the film layer is in contact with the lens.

* * * * *